United States Patent [19]
Kovalenko

[11] Patent Number: 5,199,391
[45] Date of Patent: Apr. 6, 1993

[54] TOROIDAL INTERNAL COMBUSTION ENGINE

[76] Inventor: Gerald E. Kovalenko, 8009 Diving Cliff La., Springfield, Va. 22153

[21] Appl. No.: 789,357

[22] Filed: Nov. 8, 1991

[51] Int. Cl.$^5$ .................................. F02B 53/00
[52] U.S. Cl. .................... 123/43 B; 418/35; 418/36
[58] Field of Search ............... 123/43 B; 418/35, 36; 74/84 R

[56] References Cited

U.S. PATENT DOCUMENTS

| | | | |
|---|---|---|---|
| 1,224,642 | 5/1917 | Holmes | 418/35 |
| 1,292,171 | 1/1919 | Walk . | |
| 1,308,352 | 7/1919 | Green | 418/36 X |
| 1,352,127 | 9/1920 | Henderson . | |
| 1,590,368 | 6/1926 | Hasse . | |
| 1,628,162 | 5/1927 | Lehnert . | |
| 1,790,534 | 1/1931 | Chevallier et al. | 418/35 |
| 2,651,206 | 9/1953 | La Veille . | |
| 3,580,228 | 5/1971 | Rocha | 123/18 A |
| 3,599,611 | 8/1971 | Staat | 418/36 |
| 3,602,203 | 8/1971 | Mowry | 123/18 A |
| 3,666,063 | 5/1972 | Schoeman et al. | 192/21 |
| 3,739,755 | 6/1973 | Folstadt | 418/36 X |
| 3,938,480 | 2/1976 | Yanda | 123/43 B |
| 4,127,367 | 11/1978 | Smith | 418/36 |
| 4,553,503 | 11/1985 | Cena | 123/18 A |
| 4,951,615 | 8/1990 | Pahis | 123/18 R |
| 5,046,465 | 9/1991 | Yi | 123/248 |

FOREIGN PATENT DOCUMENTS 242280 7/1926 United Kingdom .............. 123/43 B

*Primary Examiner*—Michael Koczo
*Attorney, Agent, or Firm*—Nies, Kurz, Bergert & Tamburro

[57] ABSTRACT

A rotary internal combustion engine including a plurality of toroidal cylinders and toroidal pistons that are slidably carried within the cylinders. Combustion of an air-fuel mixture within the respective cylinders provides a series of circumferential power strokes for more efficient operation. The pistons and cylinders are carried by a pair of side-by-side, coaxial drive rotors, the output power pulses of which are transmitted through a drive clutch and planetary gear assembly to an engine output drive shaft. The drive clutch and planetary gear assembly includes four overrunning clutches and a planetary gear train to smoothly transmit the successive intermittent engine power strokes to the output drive shaft.

28 Claims, 19 Drawing Sheets

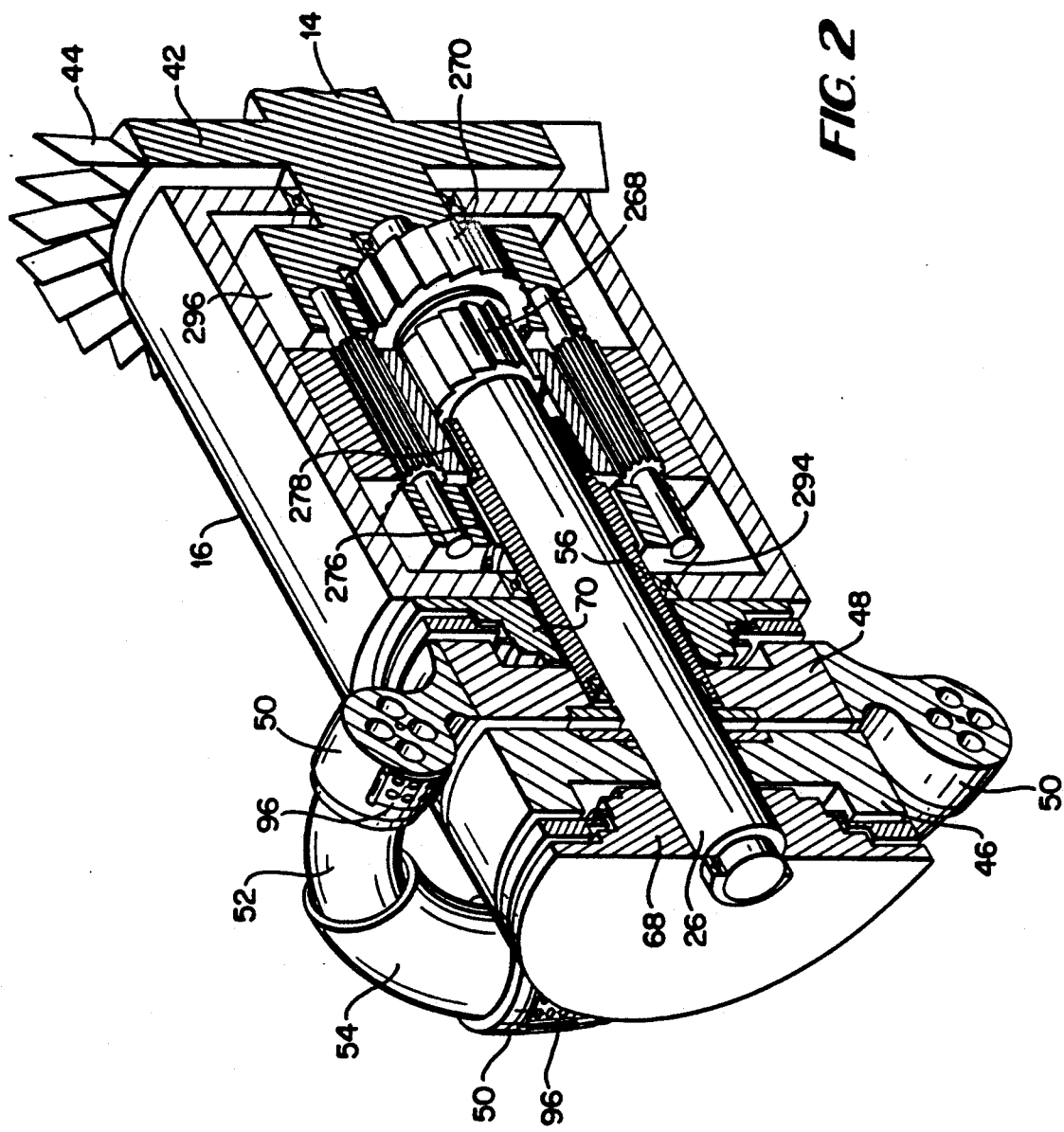

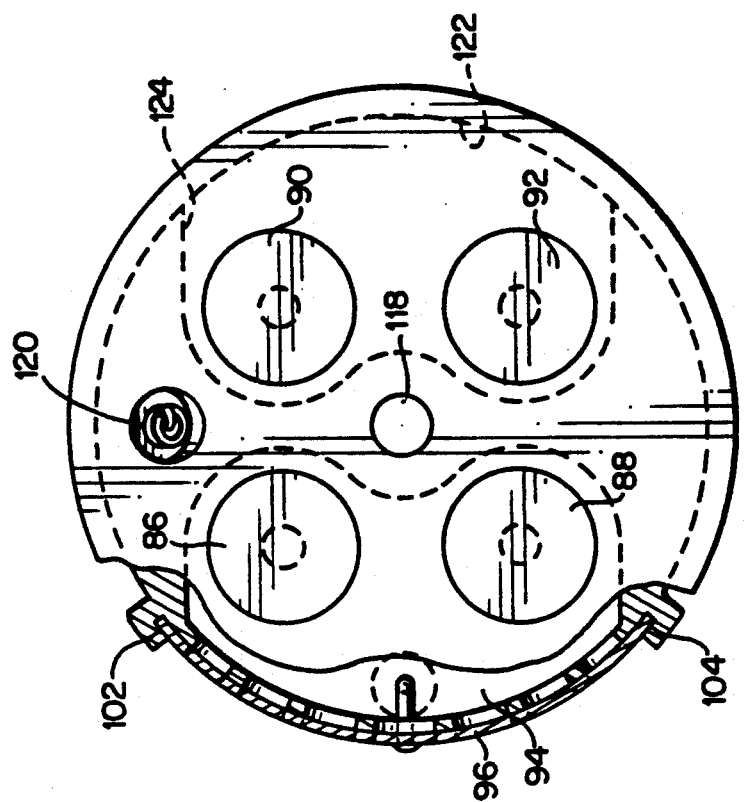
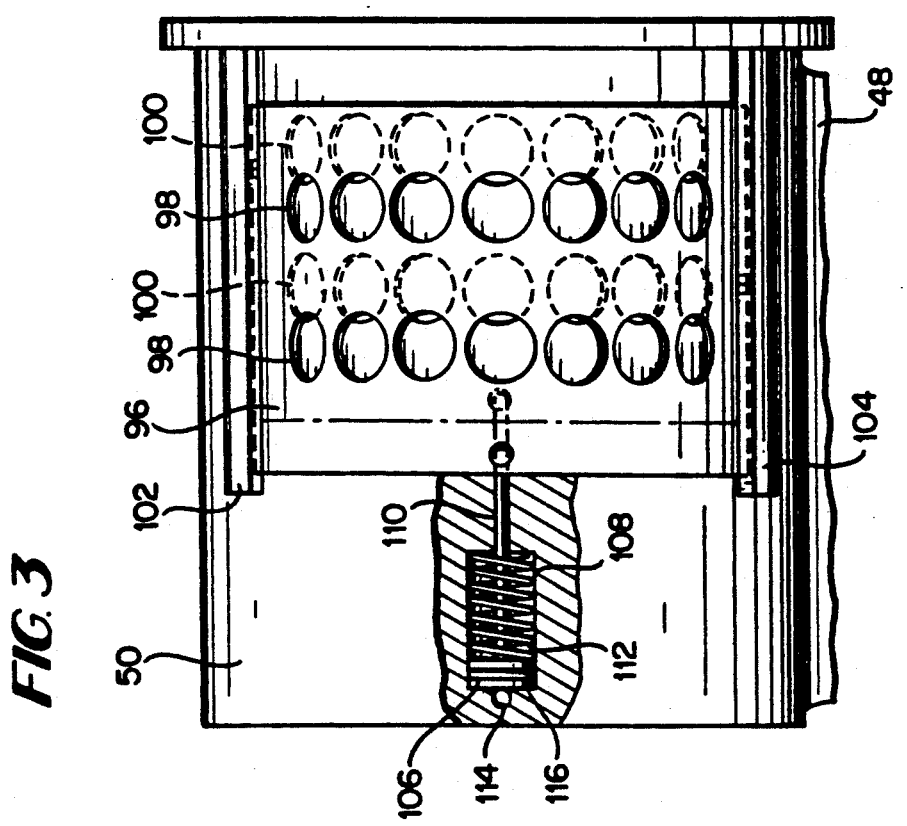

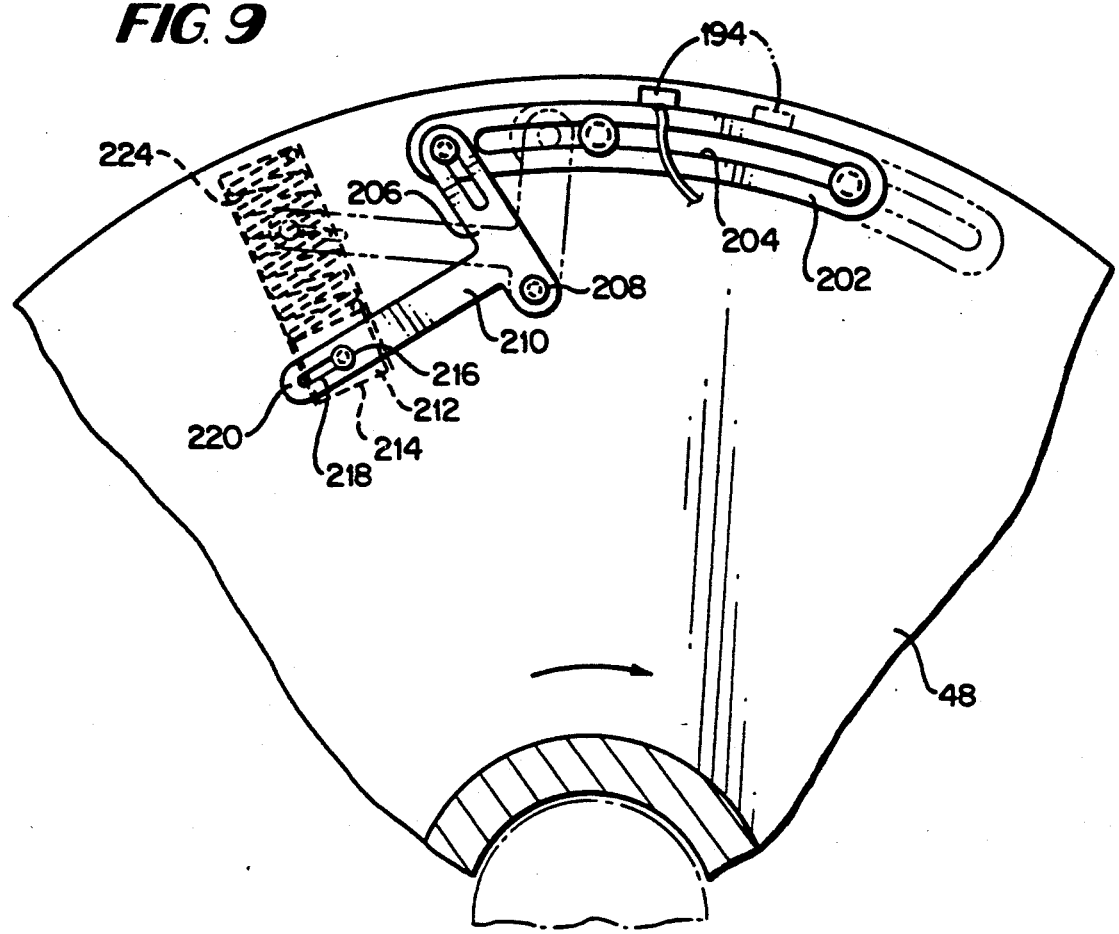
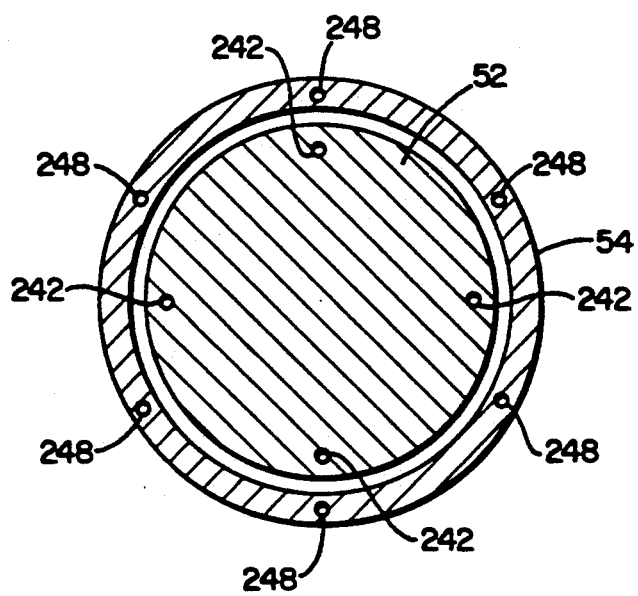

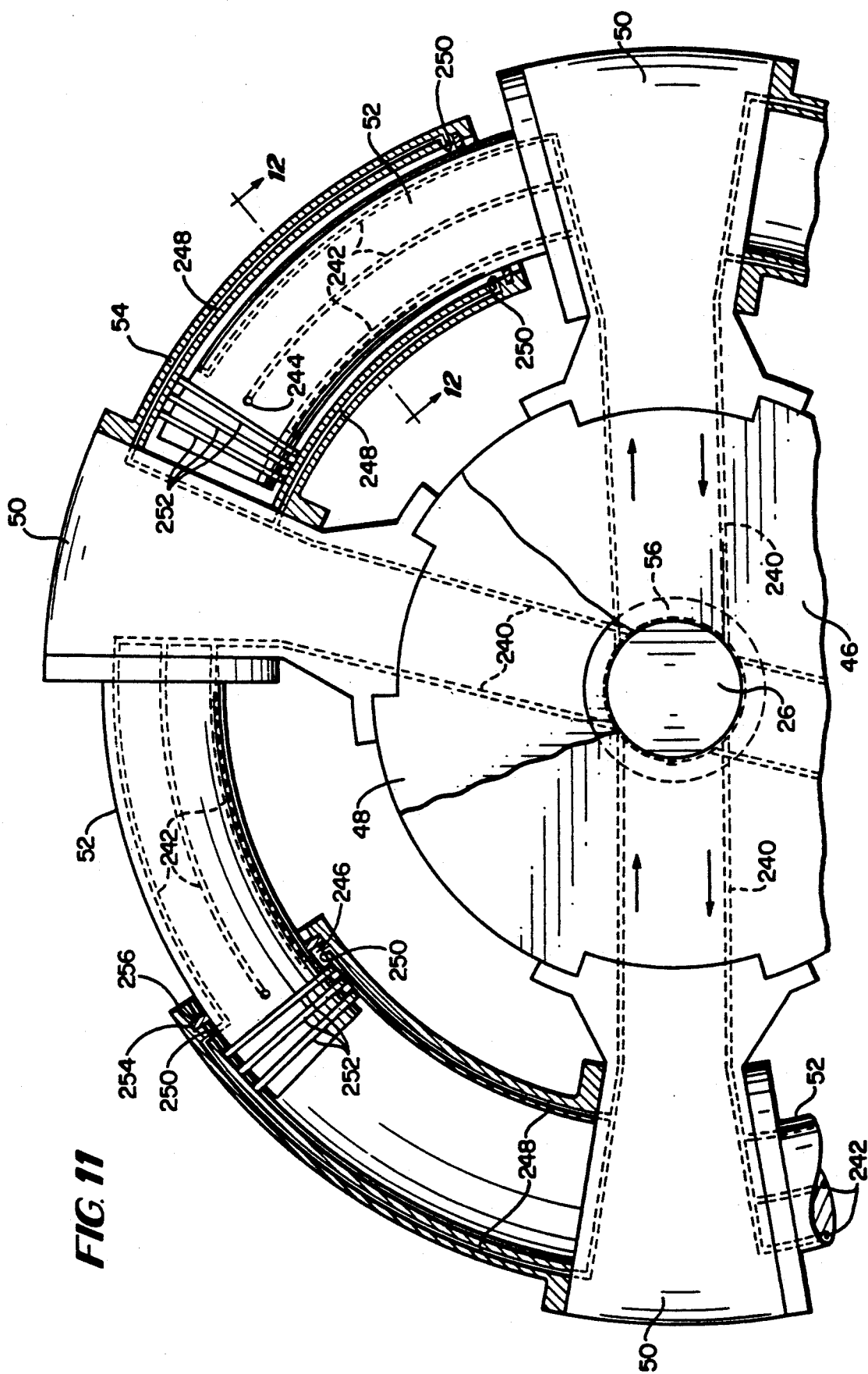

TOROIDAL INTERNAL COMBUSTION ENGINE

BACKGROUND OF THE INVENTION

1. Field of the Invention

The present invention relates generally to multi-cylinder internal combustion engines for providing rotary power output. More particularly, the present invention relates to a toroidal internal combustion engine having a plurality of toroidal cylinders that slidably receive toroidal pistons to provide a desired direct rotary power output level in a smaller size and smaller weight engine than conventional, linearly reciprocating piston engines.

2. Description of the Related Art

Conventional internal combustion engines of the spark ignition or compression ignition type each rely upon the linear, oscillatory movement of a piston that reciprocates within a linear cylinder. The linear movement of the piston is translated into rotary motion by means of a connecting rod that extends between the piston and an offset crank arm carried by a crank shaft that provides the output power. Because of the need to convert linear reciprocating motion into rotary motion, and because of the resultant mass of the necessary connecting rods, crank arms, and the crankshaft counterweights that are necessary to counterbalance the offset loads imposed on the crankshaft, considerable available energy is not available because of the necessity to convert the linear motion into rotary motion.

Rotary engines are known in which the operation of converting linear reciprocating motion into rotary motion has been eliminated. For example, in U.S. Pat. No. 3,938,480, which issued Feb. 17, 1976, to Leon M. Yanda, there is disclosed an internal combustion engine having several pistons and cylinders that are each arc-shaped, with the pistons and cylinders each connected directly with a respective rotor for direct conversion of the output power strokes into rotary motion, without the need for transformation from rectilinear into rotary motion.

It is an object of the present invention to provide an improved rotary internal combustion engine of the toroidal-cylinder type.

SUMMARY OF THE INVENTION

Briefly stated, in accordance with one aspect of the present invention, a rotary, multi-cylinder, internal combustion engine of the toroidal piston and cylinder type is provided. The engine includes a pair of coaxial, independently rotatable drive rotors, each rotor carrying a plurality of interengaging toroidal piston sectors and toroidal cylinder sectors to define a plurality of rotary acting power cylinders for imparting substantially circumferentially acting power strokes to an engine output drive shaft. A drive clutch and planetary gear assembly is positioned between the engine and an output shaft. The drive clutch and planetary gear assembly is drivingly connected with each of the drive rotors and with the engine output drive shaft for transmitting the alternating, intermittent, rotary power strokes of the respective drive rotors through the drive clutch and planetary gear assembly to the output drive shaft in order to provide substantially smooth, continuous output power.

The drive assembly includes a plurality of axially spaced overrunning clutches, each clutch drivingly connected with a planetary gear train for imparting a unidirectional rotation to the engine output drive shaft.

BRIEF DESCRIPTION OF THE DRAWINGS

FIG. 2 is a perspective view, in longitudinal section, showing the engine drive clutch and planetary gear structure, without the casing and additional elements shown in FIG. 1.

FIG. 3 is an enlarged fragmentary view, partially broken away, showing the structure of an air flow control door for controlling engine inlet airflow.

FIG. 4 is an enlarged end view, partially broken away, showing the inlet and exhaust valve positions and an end view of the inlet airflow control door shown in FIG. 3.

FIG. 9 is an enlarged, fragmentary view showing the spark advance mechanism for the ignition system illustrated in FIG. 8.

FIG. 11 is an enlarged, fragmentary view, partially in section, showing the interconnected toroidal cylinders and toroidal pistons and the associated lubricating oil passageways.

FIG. 12 is a cross-sectional view taken along the line 12—12 of FIG. 11.

DESCRIPTION OF THE PREFERRED EMBODIMENTS

Figure 1:
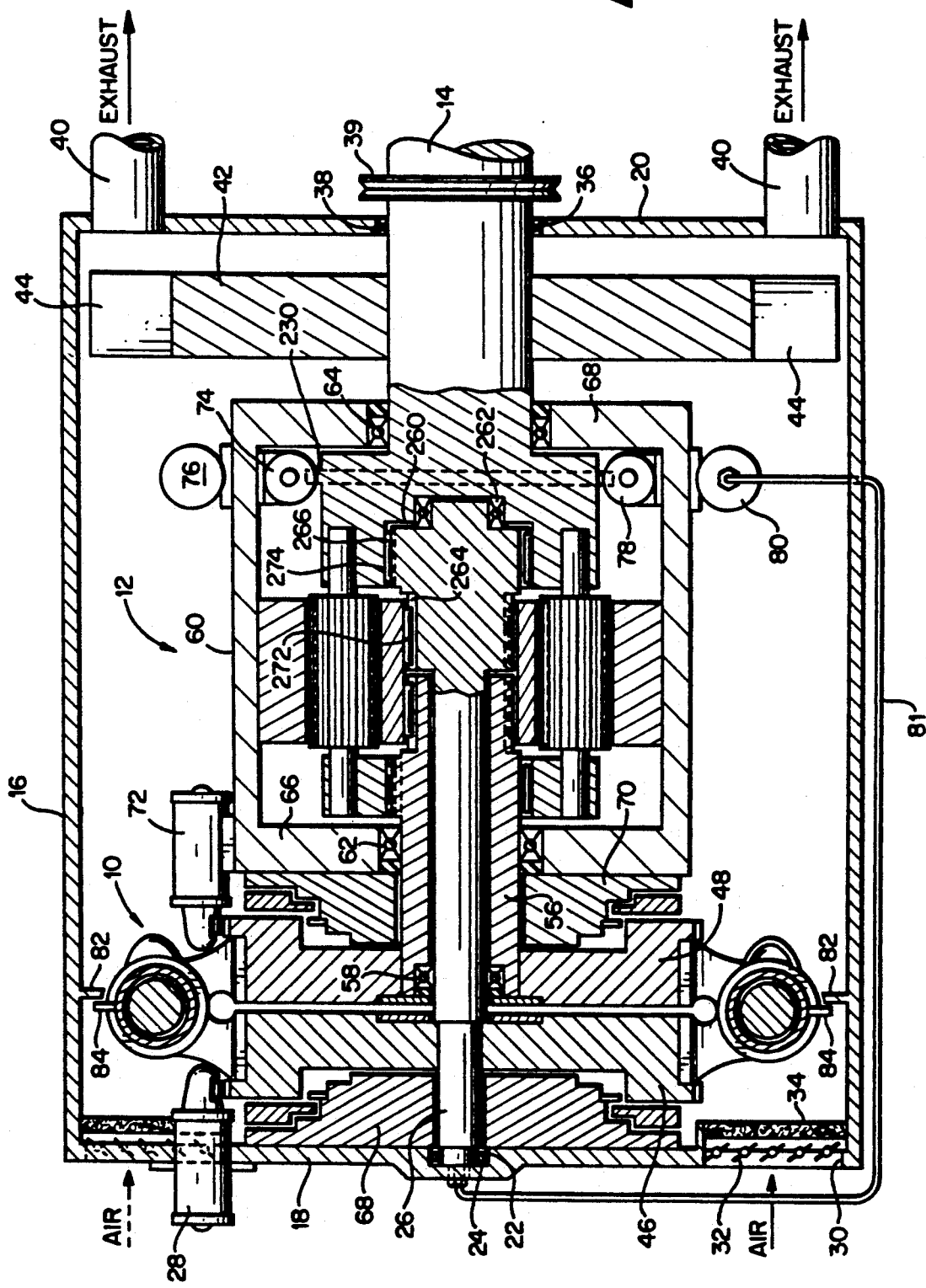
FIG. 1 is a cross-sectional, side elevational view of a toroidal internal combustion engine in accordance with the present invention.

Referring now to the drawings, and particularly to FIG. 1 thereof, there is shown a rotary engine 10 in accordance with the present invention, the engine being drivingly connected with a drive clutch and planetary gear assembly 12 to drive an output shaft 14. Engine 10 and drive clutch and planetary gear assembly 12 are housed within an outer casing 16, which is preferably cylindrical and which includes a front wall 18 and a rear wall 20 to enclose the ends of casing 16.

OVERALL ENGINE STRUCTURE

Front wall 18, which is a disc-shaped structure, includes an annular recess 22 for receiving a radial and thrust bearing 24 that rotatably carries an engine drive shaft 26. Front wall 18 also supports a first engine starter 28, and it includes a plurality of openings 30 (only one of which is visible in FIG. 1) within which respective inlet air flow control louvers 32 are positioned for pivotal movement to control the flow of outside air into the interior of engine casing 16. Immediately downstream of each set of flow control louvers 32 is an air filter 34 for filtering particulate matter from the incoming air, which serves both for combustion purposes as well as for engine cooling purposes.

Rear wall 20 of engine casing 16 includes a central opening 36 supporting a radial bearing 38 to permit output drive shaft 14 to rotate and to extend outwardly through casing 16 to a load (not shown), which can be, for example, the drive train of an automobile. Additional loads, such as an alternator, a power steering pump, an air conditioner compressor, and the like, can be driven by a belt that passes over output pulley 39.

A plurality of exhaust pipes 40 extend through rear wall 20 and are positioned radially outwardly of the longitudinal centerline of casing 16 and substantially adjacent to the outer periphery of a flywheel 42 secured to output drive shaft 14. Flywheel 42 includes a plurality of radially outwardly extending, circumferentially spaced exhaust fan blades 44 that are so configured as to draw air into the space between the periphery of engine 10 and the periphery of drive clutch 12 and outer casing 16 for cooling purposes. Fan blades 44 also serve to draw exhaust gases that emanate from engine 10, and that are within outer casing 16, in order to direct those gases into exhaust pipes 40.

The interior structure of engine 10 and of drive clutch and planetary gear assembly 12 are shown in cross section in FIG. 1 and are shown in perspective in FIG. 2. Referring to FIG. 2, engine 10 includes a first drive rotor 46 and a second drive rotor 48, each of which rotors carries a pair of cylinder heads 50 that are positioned 180° apart. Each cylinder head 50 includes a piston 52 that extends from one side of the cylinder head and that is curved and has essentially the shape defined by a sector of a solid toroid. Extending from each cylinder head 50 in a direction opposite from piston 52 is a curved sleeve that is in the form of a arc-shaped cylinder 54, which has essentially the shape of a sector of a tubular toroid.

The construction of each of rotors 46 and 48 is such that two such cylinder heads 50 are provided on each rotor, the cylinder heads on a given rotor spaced 180° from each other and the respective cylinder heads of one rotor offset by 90° from the cylinder heads of the other rotor. Thus, each cylinder head of a rotor carries an arc-shaped piston 52 on one side of the cylinder head and an arc-shaped cylinder 54 on the other side of the cylinder head, with each of the pistons of one rotor extending into respective adjacent cylinders of the other rotor to define a four cylinder rotary engine wherein the cylinders are substantially equidistantly circumferentially spaced form each other.

As also shown in FIG. 2, first drive rotor 46 is secured to engine drive shaft 26 to rotate therewith, and second drive rotor 48 is secured to a tubular engine drive sleeve 56 that surrounds and is coaxial with engine drive shaft 26. Bearing 58 (see FIG. 1) between the engine drive shafts permits engine drive shaft 26 to rotate relative to and independently of engine drive sleeve 56.

Drive clutch and planetary gear assembly 12 is carried within a housing 60, which is positioned internally of outer casing 16 and is supported on axially spaced radial bearings 62 and 64 that are carried on engine drive sleeve 56 and on engine output drive shaft 14, respectively. As best seen in FIG. 1, each of engine drive sleeve 56 and engine drive shaft 14 extend partially into housing 60 for connection with the drive clutch and planetary gear assembly 12, as will be hereinafter explained in greater detail.

Front wall 18 of outer casing 16 and end wall 66 of housing 60 each carry similarly configured stationary hydraulic and fuel control cam assemblies 68, 70, respectively, for controlling the operation of the hydraulically operated engine intake and exhaust valves, and for injecting fuel into the respective cylinders.

Also shown in FIG. 1 are a second starter motor 72, an oil pump 74, an oil filter 76, a fuel pump 78, and a fuel filter 80, each of which operates in a conventional manner.

Engine outer casing 16 includes an inwardly directed flange 82 spaced inwardly of front wall 18 to define an air flow baffle with a corresponding outwardly extending flange 84 carried on the cylinder head and cylinder sleeve portions of the respective rotors. The air flow baffle is provided to restrict the volume of air flowing past the baffle, so that air drawn into outer casing 16 is confined within the forward end of outer casing 16 and is made available primarily for intake into the engine for combustion purposes, with the excess air passing through the air flow baffle and over the outer surfaces of engine 10 and of housing 60 for cooling purposes. The excess air also mixes with and serves to dilute engine exhaust gases that are discharged from the cylinders into the space between drive clutch housing 60 and outer casing 16.

CYLINDER INLET AND EXHAUST SYSTEM

Figure 5:
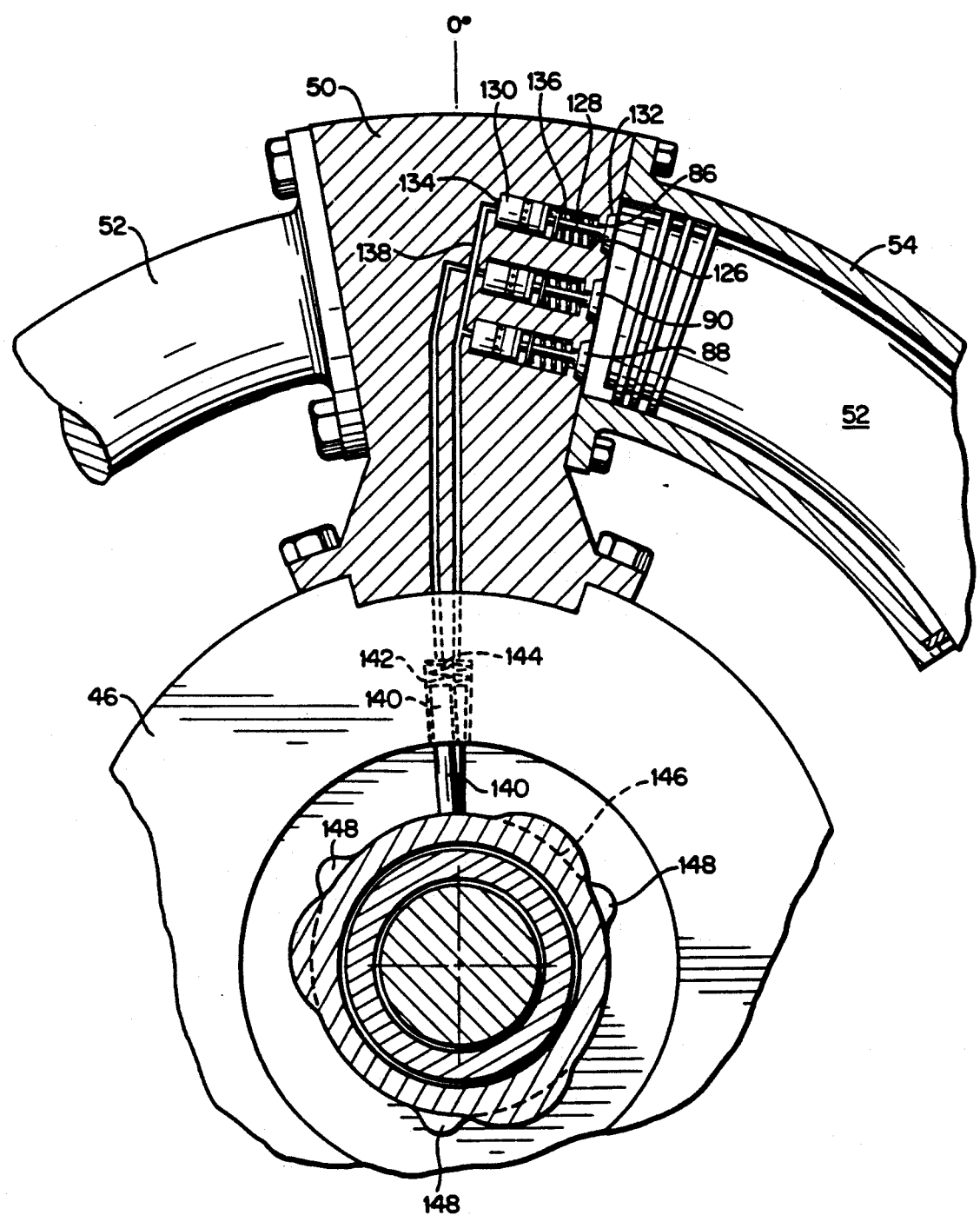
FIG. 5 is an enlarged, fragmentary side view of a portion of a rotor of the engine illustrated in FIG. 1, showing a portion of the hydraulic inlet and exhaust valve actuation system.

Referring now to FIGS. 3, 4, and 5, the respective cylinder heads 50 each include a pair of inlet valves 86, 88 and a pair of exhaust valves 90, 92. As shown in FIG. 5, each of the inlet valves and each of the exhaust valves is of the poppet-valve-type, the inlet valves controlling communication between the inlet air chamber 94 and the interior of cylinder sleeve 54.

Each of the cylinders receives incoming inlet air that enters outer casing 16 (see FIG. 1) through air inflow control louvers 32 and that then enters inlet air chamber 94 through an inlet air flow control door 96, as best seen in FIGS. 3 and 4. Air flow control door 96 is a curved, plate-like member that includes a plurality of apertures 98 that extend through the plate, the apertures corresponding in size and shape with similar openings 100 provided in cylinder head 50 to permit air to enter inlet air chamber 94. Door 96 is slidably received between and is carried on a pair of longitudinally extending door guide slots 102, 104 carried by cylinder head 50, and is movable along the slots by an inlet door piston 106 carried in an inlet door cylinder 1 08, with piston 106 including an air door control rod 110 connected with door 96. Inlet door piston 106 is spring biased by spring 112 to place door 96 in a closed position, so that the respective door apertures 98 are out of registry with corresponding cylinder head apertures 100, to thereby block the flow of incoming air to the interior of the cylinder.

Inlet door piston 106 is actuated by the introduction of pressurized hydraulic fluid through passageway 114 to act against face 116 of piston 106 to thereby shift piston 106, control rod 110 and door 96 to provide at least partial overlap of control door apertures 98 with respect to the cylinder head apertures 100, to thereby control the volume of inlet airflow to the interior of respective cylinder sleeves 54.

As also seen in FIG. 4, cylinder head 50 also includes a substantially centrally positioned fuel inlet valve 118 for admitting pressurized fuel into the cylinder at appropriate times, and also a spark plug 120 for timely igniting the air-fuel mixture contained within the cylinder.

Exhaust valves 90 and 92 control communication between the interior of the cylinder and an exhaust gas chamber 122 that includes an exhaust outlet 124 to convey exhaust gases into the space between engine 10 and outer casing 16. As noted earlier, the exhaust gases from the engine are subsequently drawn toward exhaust outlets 40 by the exhaust fan blades 44 carried by flywheel 42, as shown in FIG. 1.

VALVE ACTUATION SYSTEM

Figure 6:
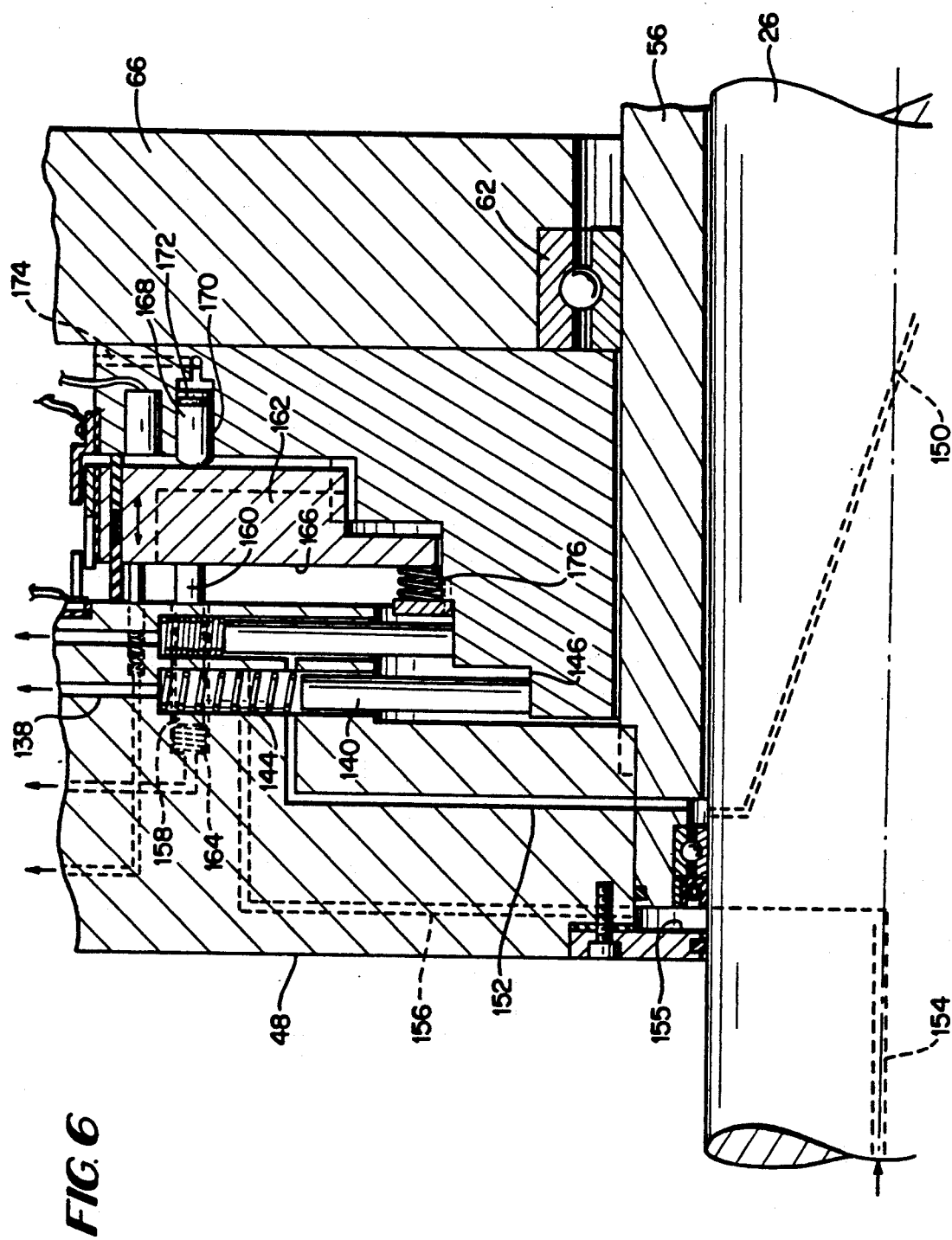
FIG. 6 is an enlarged, fragmentary view, partially in section, showing a portion of the ignition, fuel, and inlet and exhaust valve actuation structure for the engine illustrated in FIG. 1.
Figure 7:
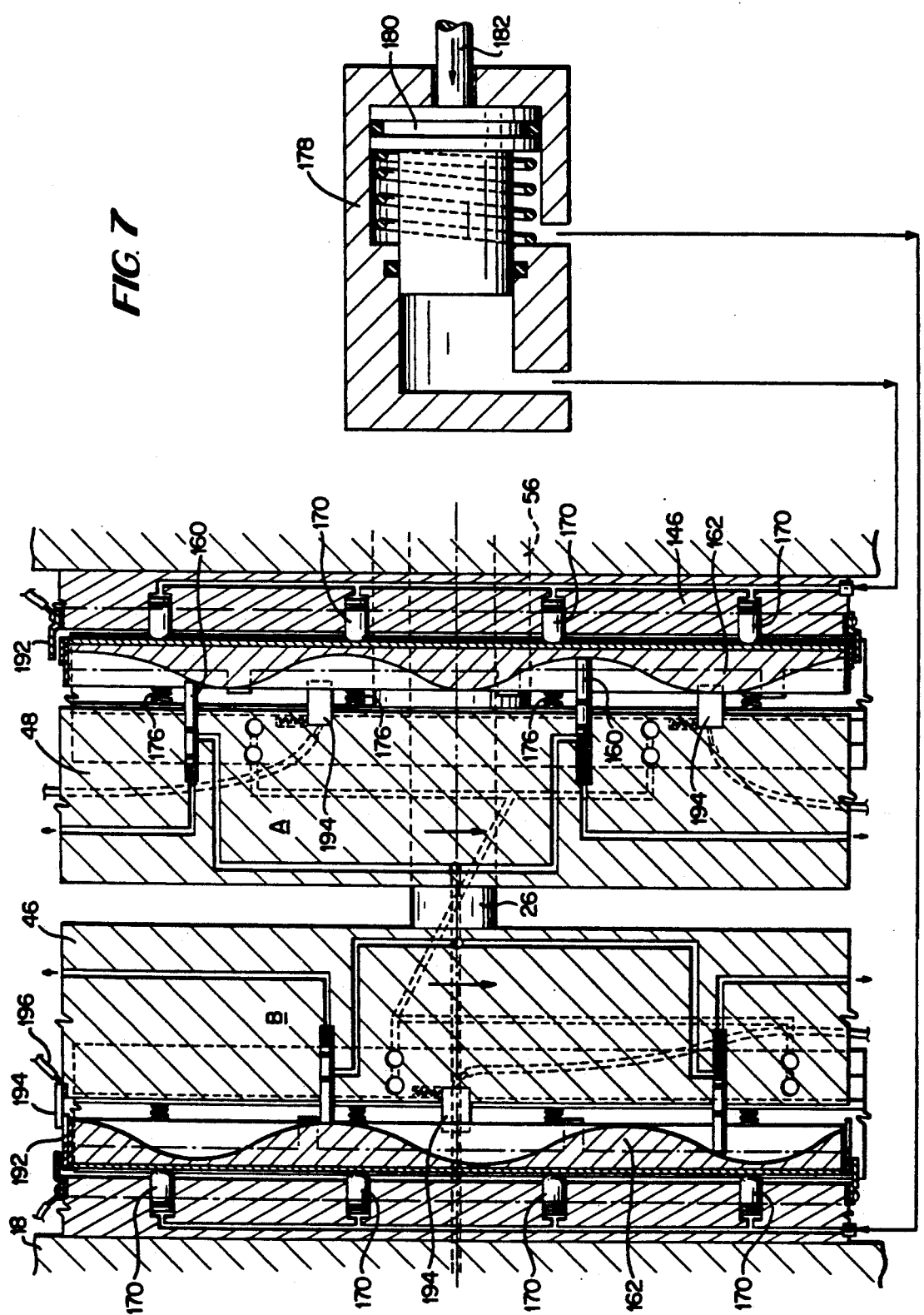
FIG. 7 is an enlarged, fragmentary, two-dimensional development, in section, of portions of the fuel injector actuation cams and associated rotor discs for the engine illustrated in FIG. 1, also showing a portion of the ignition system.

The inlet and exhaust valves associated with the respective cylinders are actuated hydraulically, and the associated actuation apparatus is shown in FIGS. 5, 6, and 7. As shown in FIG. 5, each of inlet valves 86, 88 and each of exhaust valves 90, 92 is similarly configured, and the following description of the structure of the valves, although described in relation to inlet valve 86, is applicable to each of those valves.

Inlet valve 86 includes a frustoconical valve head 126, a valve stem 128 extending from one side of valve head 126, and a valve piston 130 at the opposite end of valve stem 128. Valve head 126 is adapted to engage with a valve seat 132 in cylinder head 50 to selectively permit or prevent the flow of inlet air into the cylinder. Valve piston 130 is slidably carried in cylinder head 50 within a valve cylinder 134 and valve piston 130 is spring biased to position valve 86 in the closed position by a helical valve spring 136 that surrounds valve stem 128 and extends between valve piston 130 and an inwardly extending flange forming part of valve seat 132.

At the opposite end of valve cylinder 134 from valve seat 132 and communicating with the end face of valve piston 130 is an hydraulic fluid passageway 138 that extends within cylinder head 50 in a generally radial direction toward the central axis of engine 10.

Actuation of a valve is effected by hydraulic pressure provided by a valve actuating piston 140, that is slidably carried in a cylinder 142 formed in drive rotor 46. Piston 140 is spring biased toward the axis of engine 10 by spring 144 toward a stationary cam member 146 having radially extending cam lobes 148. Thus, as drive rotor 46 rotates, valve actuating piston 140 bears against cam member 146 and is periodically shifted by cam lobes 148 at appropriate points in the operating cycle to cause hydraulic fluid to act through hydraulic fluid passageway 138 and against the end of valve piston 130 to open valve 126 at the proper time.

As best seen in FIG. 6, hydraulic fluid is provided through an hydraulic fluid passageway 156 that extends within drive shaft 26 and communicates with hydraulic fluid passageway 152 within drive rotor 48 and that, in turn, communicates with passageway 138 within drive rotor 48 that extends to and communicates with valve cylinder 134. Thus, movement of piston 140 causes the hydraulic fluid within passageway 138 to conduct pressure to valve cylinder 134 to cause valve piston 130 to move from valve seat 132 to admit an air-fuel mixture into the cylinder.

FUEL FLOW CONTROL SYSTEM

As shown in FIG. 1, fuel from a suitable fuel tank (not shown) is drawn by fuel pump 78 through fuel filter 80 to enter a fuel line 81 that communicates with and conveys the fuel into a fuel passageway 154 within engine drive shaft 26.

As best seen in FIG. 6, the fuel enters fuel passageway 154 and is conveyed to an annular chamber 155 that communicates with fuel passageway 156 within drive rotor 48 to convey the fuel to an axially disposed fuel cylinder 158. A fuel injector piston 160 is slidably positioned within fuel cylinder 158 and is spring biased toward a fuel flow control cam 162 by a spring 164.

Fuel flow control cam 162 is an annular disc having an undulating cam surface 166 against which spring 164 urges one end of fuel injector piston 160. Fuel flow control cam 162 is stationary, relative to drive sleeve 56, and is shiftable axially relative to the axis of drive sleeve 56 by a cam actuator 168 that is slidably carried in an axially extending passageway 170 formed in hydraulic control cam 146. The inner end 172 of cam actuator 168 communicates with an hydraulic passageway 174 that receives hydraulic pressure from an accelerator (not shown) to shift cam actuator axially to thereby shift fuel flow cam 162 axially against the force of biasing spring 176 to, in turn, shift fuel injector 160 axially to regulate the quantity and timing of fuel flow to the respective cylinders.

As the accelerator is depressed, creating a demand for greater speed from the engine, cam actuator 168 is urged toward the left, as viewed in FIG. 6, thereby causing the fuel flow cam to move toward the left to increase the fuel flow to the respective injectors.

As best seen in FIG. 7, each of drive rotors 46 and 48 includes similar structure for controlling the fuel flow to cylinders carried by the respective rotors. Also shown is the engine speed control cylinder 178, which controls the flow of hydraulic fluid to actuate cam actuators 170. A speed control piston 180 is connected with an accelerator rod 182 for sliding movement within speed control cylinder 178 to hydraulically transfer accelerator rod movement to cam actuators 170 to alter the fuel flow rate to the engine.

IGNITION SYSTEM

The ignition system includes a spark plug 120 having its electrodes extending into the cylinder and positioned as shown in FIG. 4 with relation to inlet valves 86, 88, exhaust valves 90, 92, and fuel injector 118.

Figure 8:
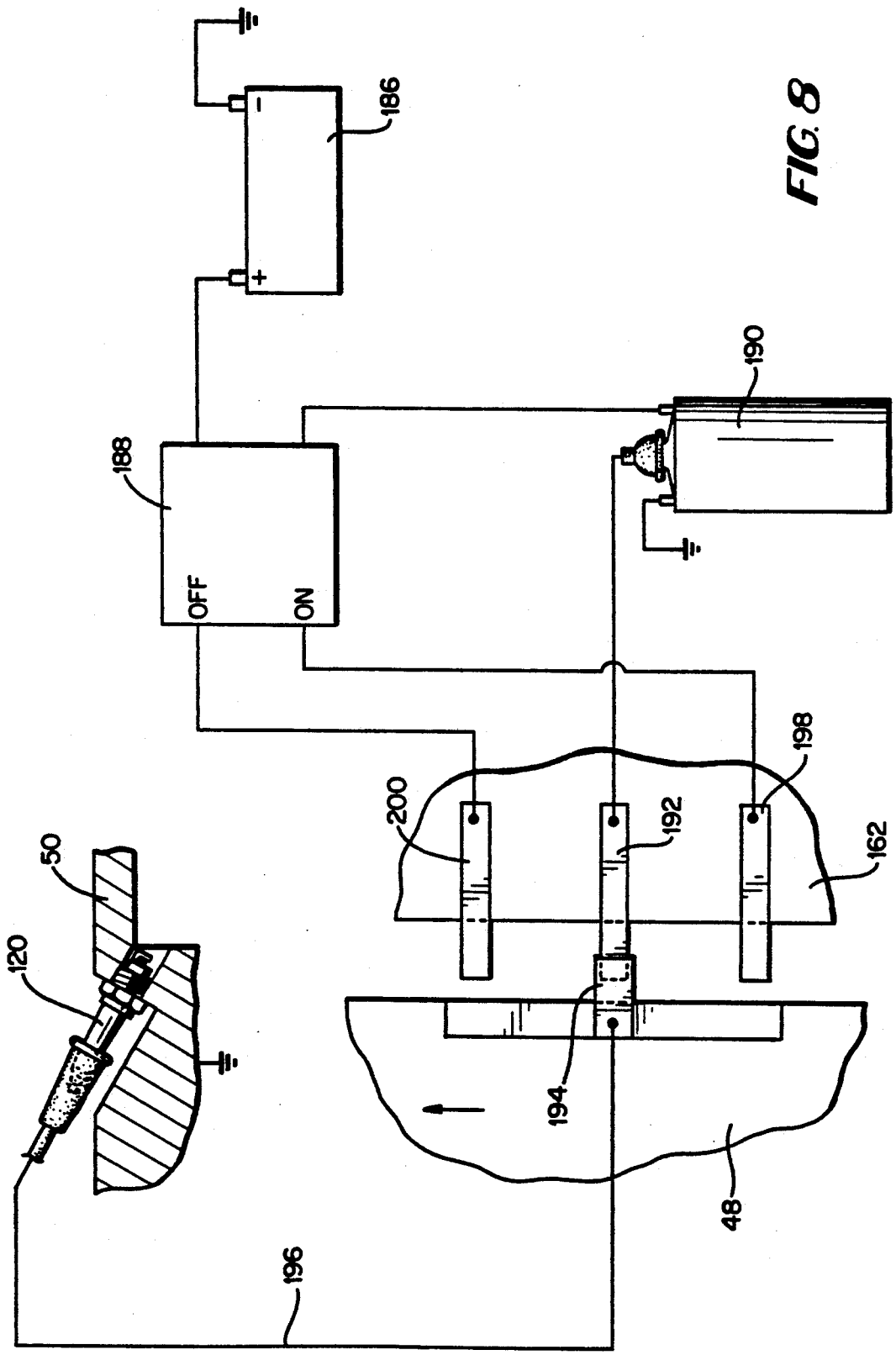
FIG. 8 is a fragmentary schematic view showing the relative positions of individual elements of various portions of an ignition system for the engine illustrated in FIG. 1.

Referring now to FIG. 8, the several elements of the ignition system are shown. That system includes a conventional storage battery 186 connected with an electronic ignition control 188 that is, in turn, connected with an ignition coil 190 that distributes a high voltage from the secondary winding of the coil to a stationary contact 192 carried on the radially outer surface of fuel flow control cam 162 (see also FIG. 7). Movable contacts 194 are carried by the respective drive rotors 46, 48, one contact 194 for each cylinder, to sequentially establish contact between stationary contact 192 and movable contacts 194 and thereby transmit the high voltage from ignition coil 190 through a spark plug wire 196 to spark plug 120, to thereby ignite the air-fuel mixture within the respective cylinders.

Additional contacts 198, 200 are also carried on fuel control cam 162 to periodically turn the electronic ignition control on and off. Movable contact 194 makes contact with contact 198 to turn on the ignition system before contacting stationary contact 192, and after it has made contact with contact 192 it contacts contact 200 to turn the ignition system off.

Referring now to FIG. 9, there is shown a spark advance mechanism whereby movable contact 194 is shifted circumferentially to change the timing of the spark. As shown, movable contact 194 is supported on a circumferentially slidable contact carrier 202, which includes an arcuate slot 204 that permits carrier 202 to move in a generally circumferential direction, relative to drive rotor 48, on a pair of spaced pins carried by drive rotor 48 and that define travel limits for carrier 202.

A first slotted lever 206 carries a pin attached to carrier 202 to shift carrier 202 in a circumferential direction. Lever 206 is pivotable about pivot pin 208 carried by drive rotor 48, and is rigidly connected with a spark advance actuator arm 210 that is connected with a weight 212 slidably carried in a guide cylinder 214. Weight 212 includes an outwardly extending pin 216 that is slidably carried in a slot 218 at the outer end 220 of spark advance actuator arm 210. Additionally, weight 212 is spring biased toward the radially innermost wall 222 of guide cylinder 214 by spring 224.

Weight 212 moves radially outwardly against the force of spring 224 as the speed of drive rotor 48 increases, to move in an upward direction, as viewed in FIG. 9, whereupon the position of movable contact 194 relative to the periphery of drive rotor 48 is shifted circumferentially from the position shown in solid lines in FIG. 9 to the position shown in dashed lines.

LUBRICATION SYSTEM

As shown in FIG. 1, engine 10 includes an oil pump 74 that is gear driven through a drive gear 230 carried by output drive shaft 14. Oil pump 74 draws lubricating oil from an oil sump (not shown) and is connected with an oil filter to supply filtered oil under pressure to the several moving parts of the engine.

Figure 10:
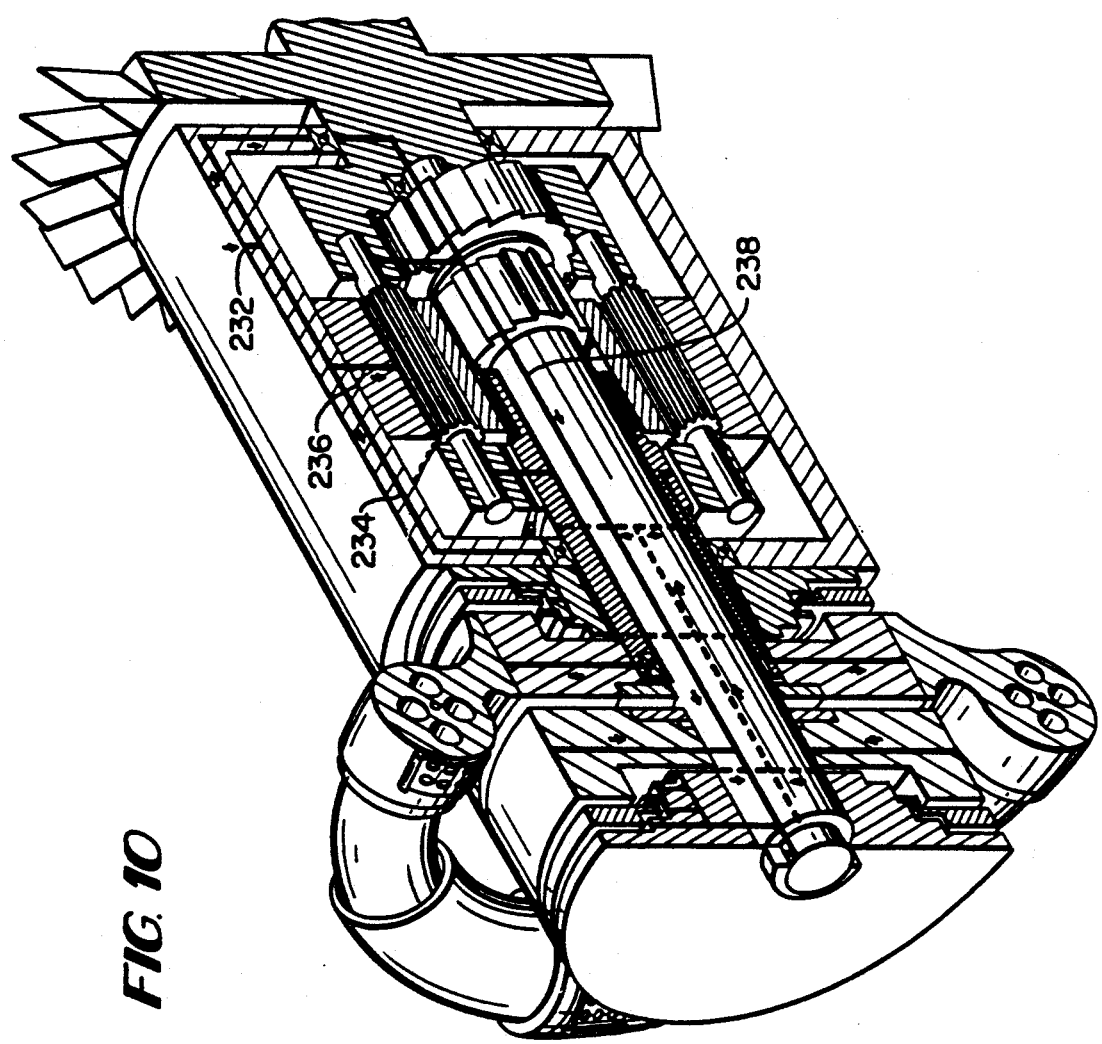
FIG. 10 is a perspective view, in longitudinal section, of the engine and drive clutch and planetary gear assembly for the engine illustrated in FIG. 1, showing the lubricating oil passageways.

As best seen in FIG. 10, pressurized lubricating oil is conveyed to drive clutch housing 60 through an oil conduit (not shown) to enter housing 60 through inlet port 232. The oil is distributed both forwardly and rearwardly in the axial direction of housing 60 by an axially extending passageway 234 to the respective front and rear shaft bearings 62, 64 that rotatably support drive sleeve 56 and output drive shaft 14, respectively. A branch conduit 236 extends from axial passageway 234 inwardly into the drive clutch assembly for subsequent distribution within the drive clutch assembly, and also into central lubrication passageway 238 within engine drive shaft 26 for distribution to various rotating parts and bearings within drive clutch 12 and engine 10 by a plurality of radial passageways as shown in FIG. 10. Those skilled in the art will appreciate the sizes and routing of the several lubricating oil conduits and passageways necessary to provide proper lubrication to the various parts of the engine and drive clutch assembly.

Referring now to FIG. 11, there is shown an example of one routing of lubricating oil passageways within the pistons and cylinders of the engine. One complete piston and cylinder assembly is shown, including cylinder head 50, piston 52, and cylinder sleeve 54, as well as two fragmentary piston and cylinder assemblies. The lubricating oil passageways are shown in dashed lines extending from engine drive shaft 26 radially outwardly into first and second drive rotors 46, 48 along radial passageways 240 to the respective cylinder heads 50. Oil flows into and along the lengths of the respective pistons 52 within a plurality of piston oil passageways 242 and through outlet openings 244 into the clearance space 246 between the outer surfaces of pistons 52 and the inner surfaces of cylinder sleeves 54.

Similarly, a plurality of cylinder sleeve passageways 248 extend within cylinder sleeves 54 from inlet openings 250 that communicate with clearance space 246 between the outer surfaces of pistons 5 and the inner surfaces of cylinder sleeves 54. Passageways 248 extend along the lengths of respective cylinder sleeves 54 to cylinder heads 50 to provide a lubricating oil return path for oil that flows from pistons 5 and lubricates piston rings 252 as they move along the inner surfaces of the respective cylinder walls. The circumferential distributions of passageways 242 and 248 within pistons 52 and cylinder sleeves 54, respectively, are shown in FIG. 12.

Clearance space 246 is closed at the outer, open end of cylinder sleeve 54 by a suitable annular oil seal 254, which is carried in an annular groove 256 formed in cylinder sleeve 54. The oil from piston passageways 242 passes through clearance space 246 and through cylinder sleeve passageways 248 for return to the oil sump or oil reservoir (not shown).

DRIVE CLUTCH AND PLANETARY GEAR ASSEMBLY

Figure 13:
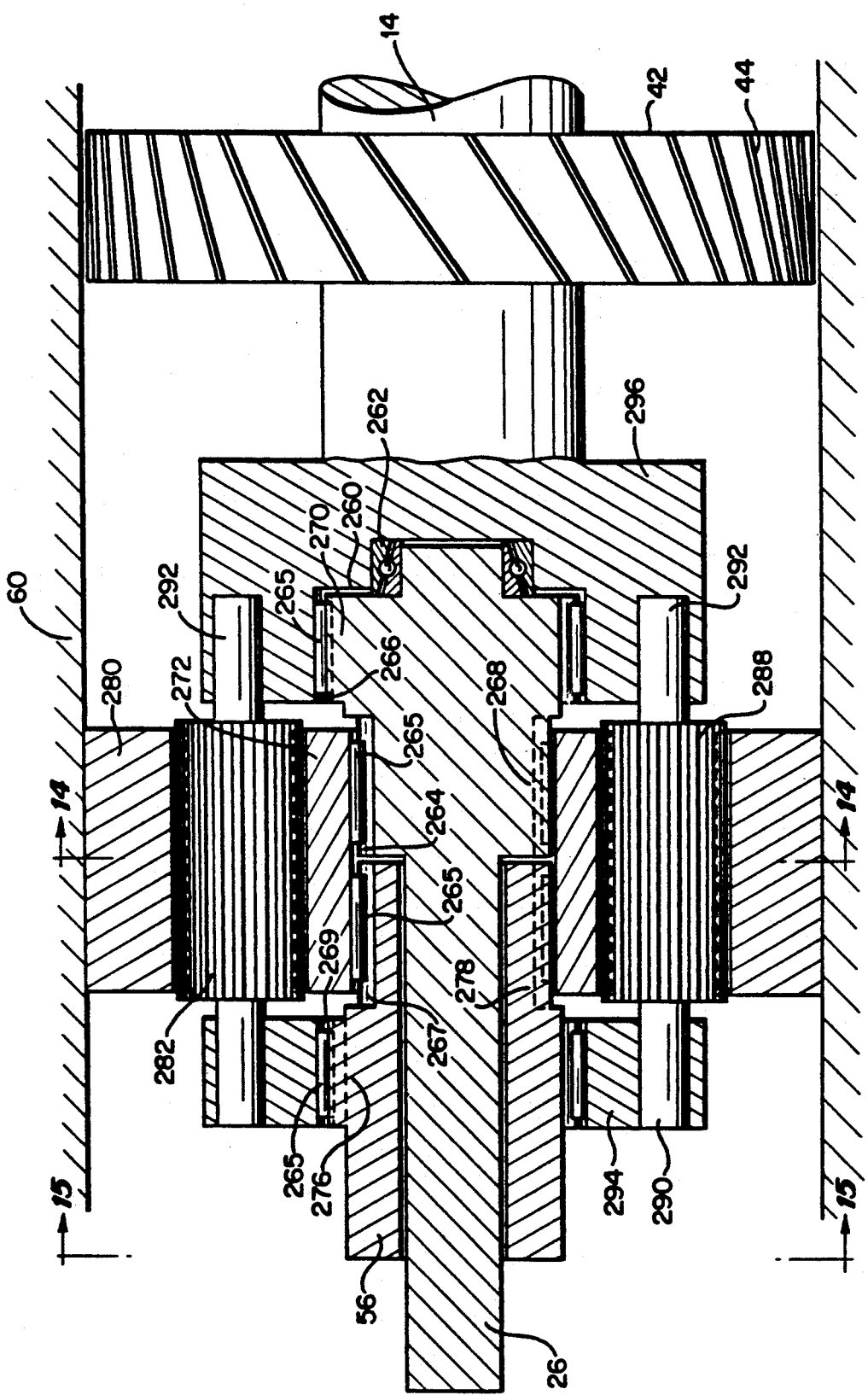
FIG. 13 is a longitudinal, cross-sectional view taken through the drive clutch and planetary gear assembly.
Figure 14:
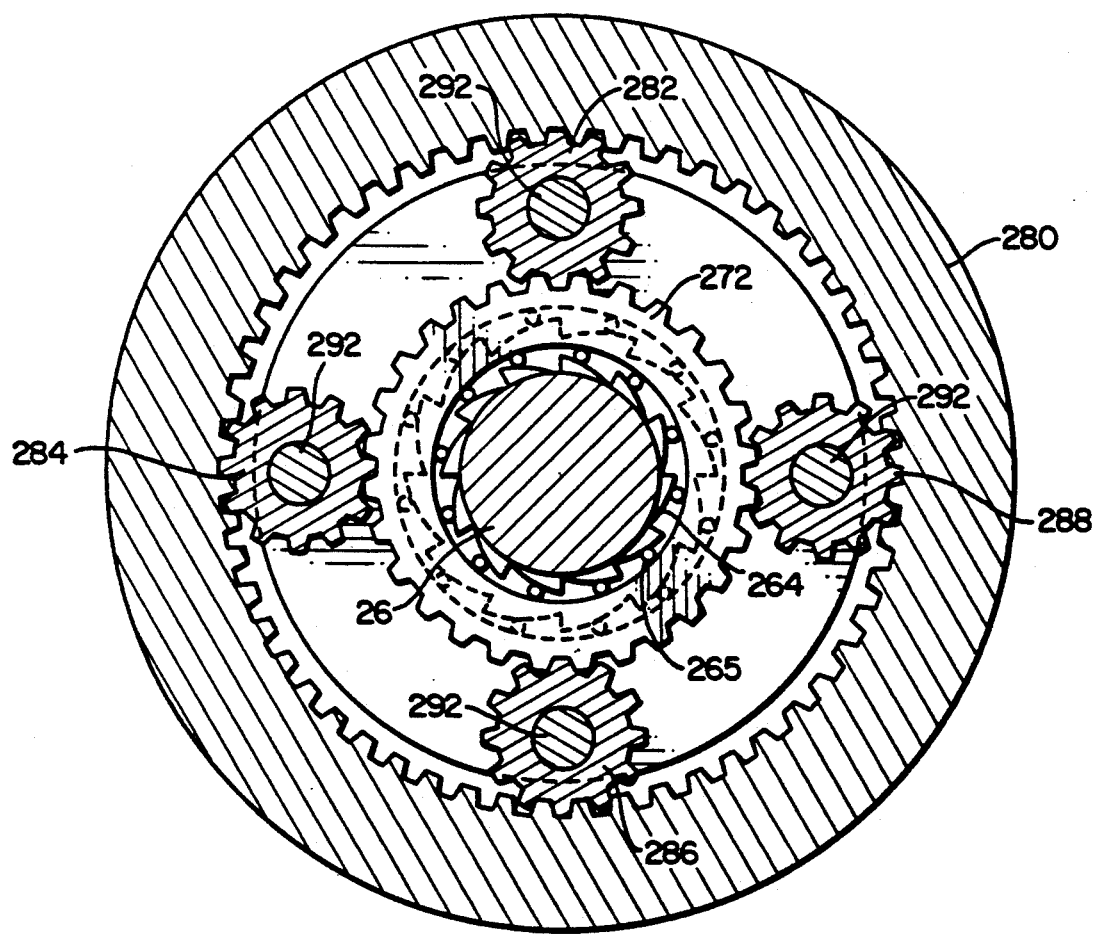
FIG. 14 is a cross-sectional view taken along the line 14—14 of FIG. 13.
Figure 15:
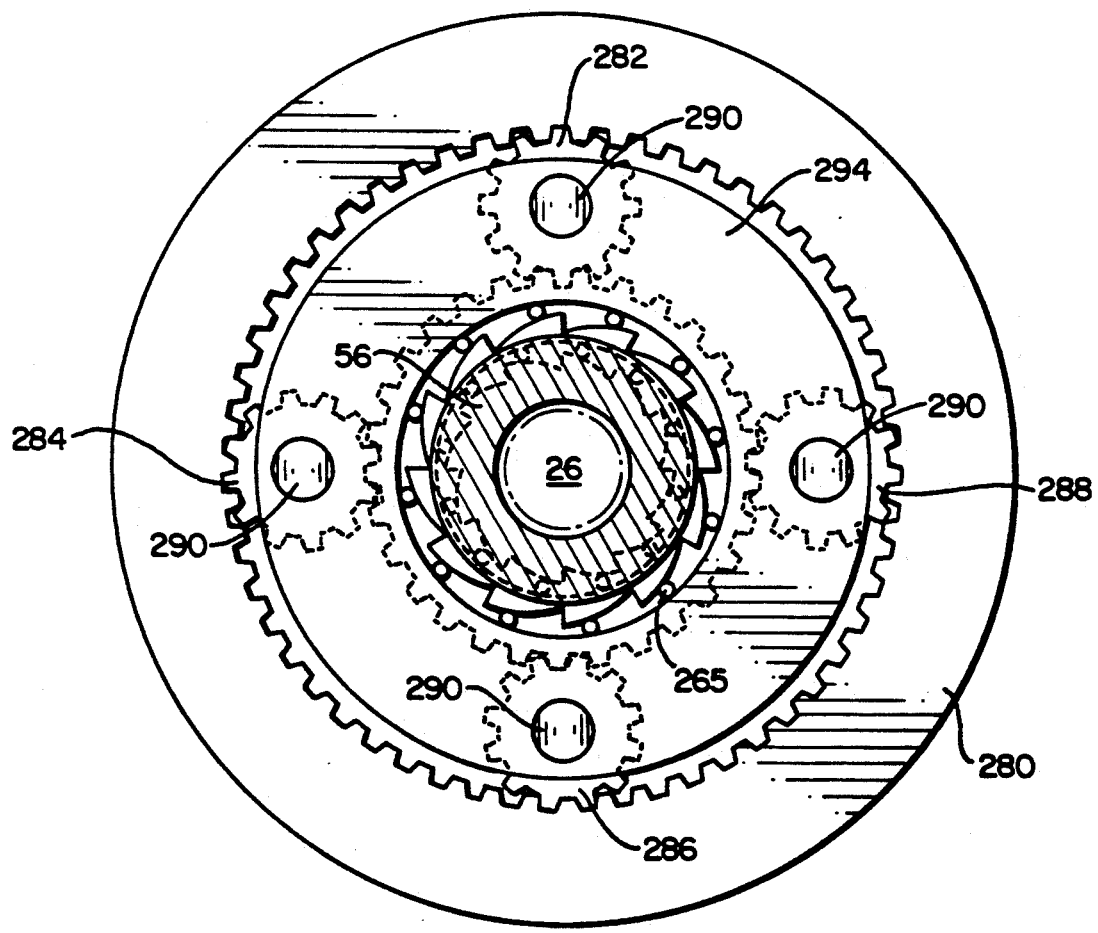
FIG. 15 is a cross-sectional view taken along the line 15—15 of FIG. 13.

The overall structure of drive clutch and planetary gear assembly 12 is shown in FIGS. 1 and 2, and additional structural details are shown in FIGS. 13 through 15. Referring first to FIGS. 1 and 2, engine drive shaft 26 connected with first drive rotor 46 extends into the interior of housing 60 and into an axial opening 260 in output drive shaft 14, and is supported therein by a combined radial and axial thrust bearing 262. Adjacent output drive shaft 14 engine drive shaft carries the driving elements 264 and 266 of a pair of axially spaced, unidirectional, or overrunning, clutches 268, 270, respectively. As best seen in FIG. 2, driving elements 264 and 266 of each of clutches 268, 270 includes a plurality of inclined circumferential drive teeth, with the inclination of the drive teeth on element 264 opposite from the inclination of the drive teeth on element 266.

As shown in FIGS. 13, 14, and 15, positioned between each of the adjacent drive teeth of clutches 268, 270, 276, and 278 are cylindrical rollers 265 that are adapted to provide a wedging action between the respective driving and driven elements of the overrunning clutches to cause driving forces to be transmitted between drive shaft 26 and respective driven elements 272, 296 in only one direction of rotation, and to permit free relative rotation of the parts in the opposite direction of rotation.

As best seen in FIG. 2, two sets of overrunning clutches 268, 270 are carried on engine drive shaft 26 that is connected with and that extends axially from drive rotor 46. Two similarly structured sets of overrunning clutches 276, 278 are carried on drive sleeve 56 that is connected with and that extends axially from second drive rotor 48.

Referring once again to FIG. 13, positioned in surrounding relationship with the two innermost overrunning clutches 268, 278 is a planetary gear train including a stationary internal ring gear 280 that is secured to the inner surface of drive clutch housing 260. Four equally circumferentially distributed planet gears 282, 284, 286, and 288 (see FIG. 14) are in meshing engagement with internal ring gear 280, and each planet gear includes a pair of oppositely disposed, outwardly extending stub shafts 290, 292 that are rotatably received in respective first and second planet carriers 294, 296. Planet carrier 294 forms the driven part of clutch 276 associated with drive sleeve 56, and planet carrier 296 forms the driven part of clutch 270 associated with engine drive shaft 26.

ENGINE OPERATION

Referring now to FIGS. 16 through 27, there is shown in progressive stages the relative positions of first rotor 46 (identified as element B) and second rotor 48 (identified as element A) as each of the piston and cylinder assemblies undergo the respective successive strokes of a four-stroke internal combustion engine cycle.

Figure 16:
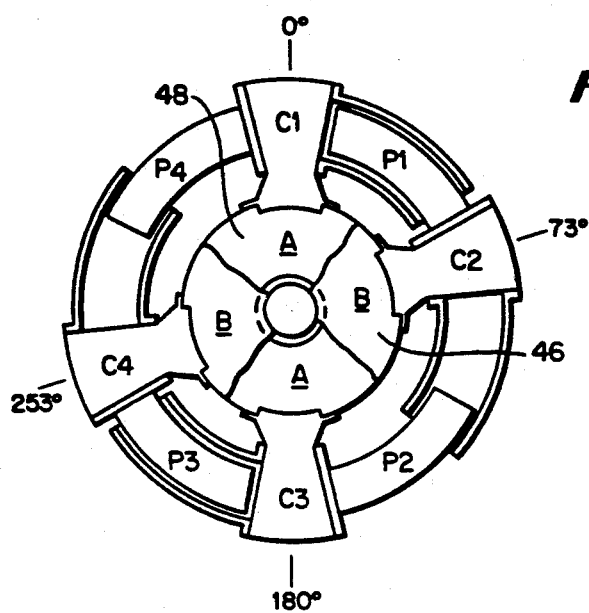
FIGS. 16 through 27 show the relative positions of the toroidal pistons and toroidal cylinders in clockwise progression as the respective rotors make a complete revolution.

In FIG. 16, cylinder head C1 is shown initially at the topmost position (0° for purposes of illustration). The cylinder associated with and carried by cylinder head C1, within which piston P1 is positioned, includes a compressed air-fuel charge, ready for ignition, by virtue of the position within the cylinder of piston P1 carried by cylinder head C2. Piston P1 is in its closest position to cylinder head C1. Upon ignition of the charge, piston P1 is urged outwardly relative to the cylinder, in a clockwise direction as viewed in FIG. 16, thereby imparting a clockwise torque to second drive rotor 48. Simultaneously, by virtue of rotation of second drive rotor 48, cylinder head C3 also shifts circumferentially clockwise. As a result, the respective rotors shift to the positions shown in FIG. 17, wherein cylinder head C1 has shifted clockwise by an angle of 13°, and cylinder head C2, carried by first drive rotor 46, has shifted clockwise by an angle of 47°.

Figure 17:
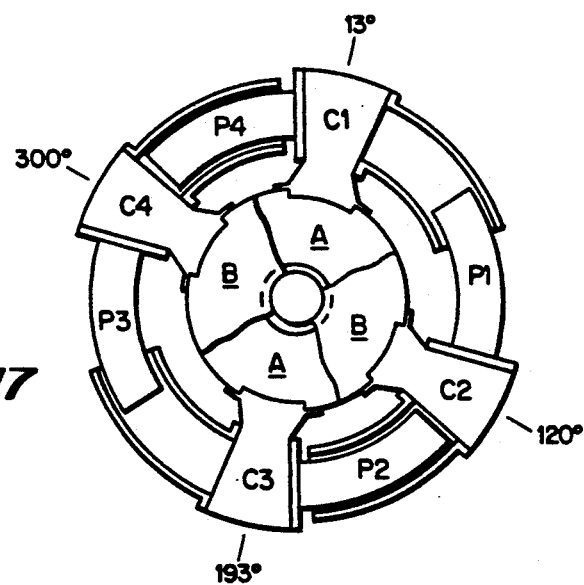
Figure 18:
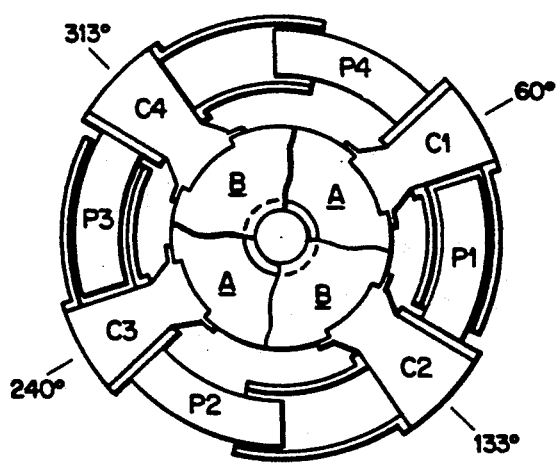
Figure 19:
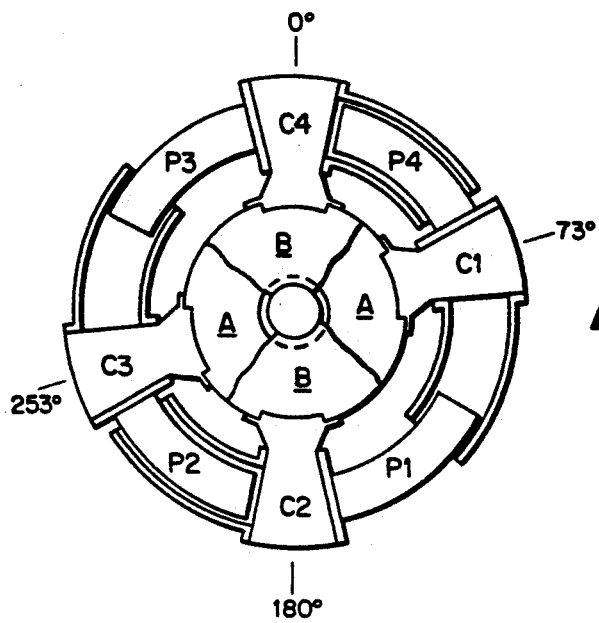
Figure 20:
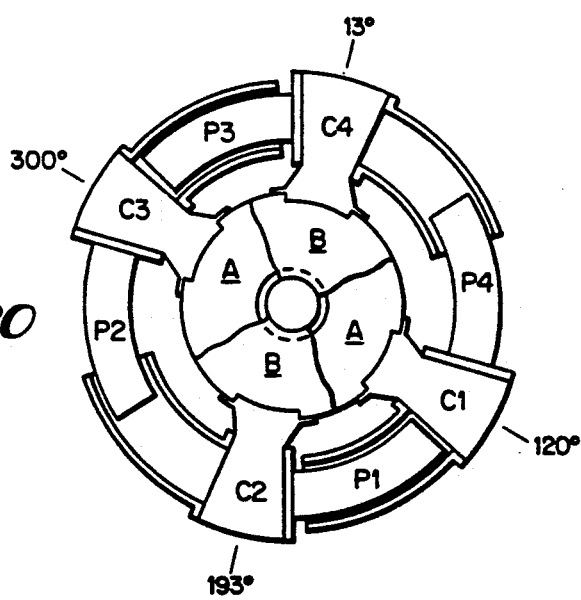
Figure 21:
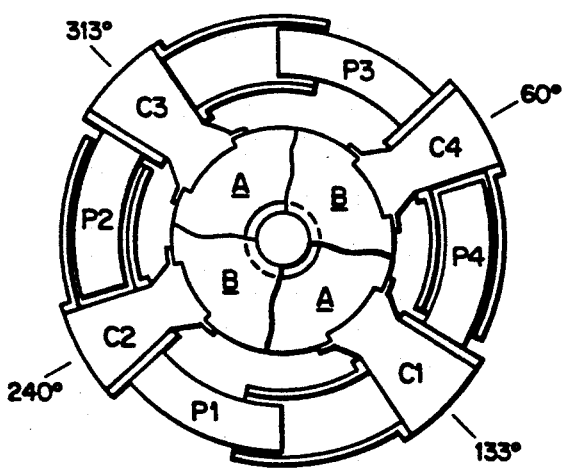
Figure 22:
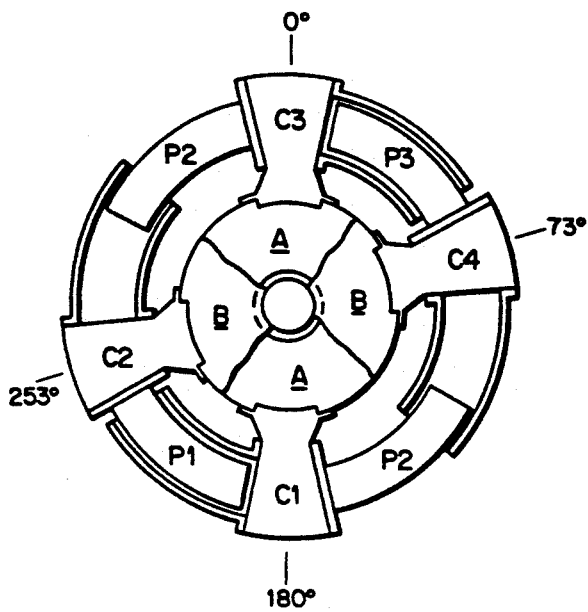
Figure 23:
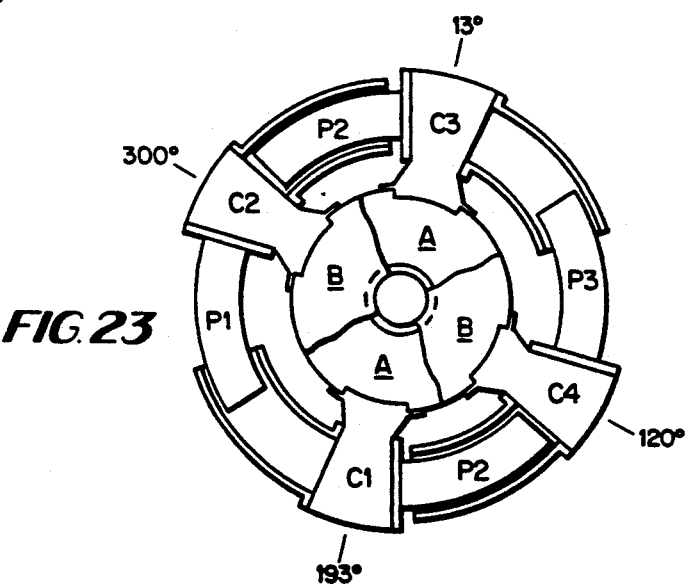
Figure 24:
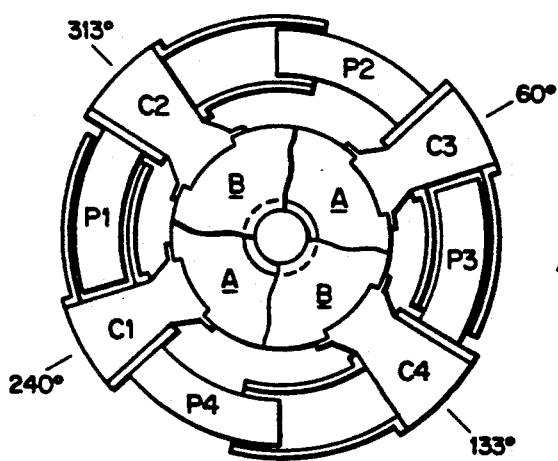
Figure 25:
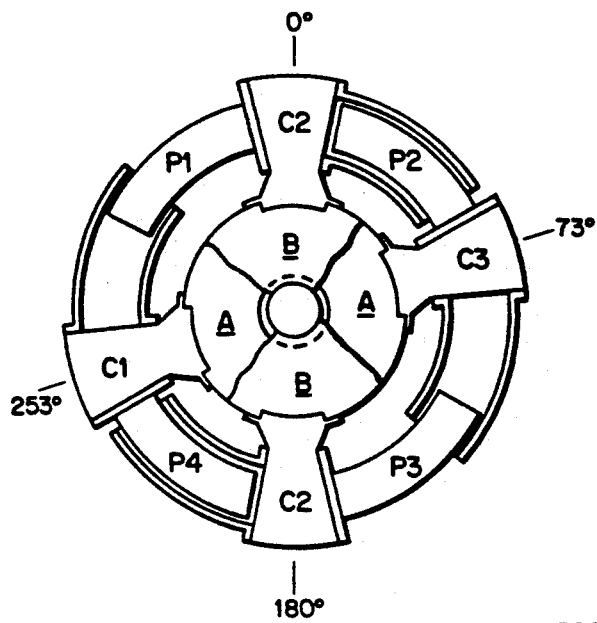
Figure 26:
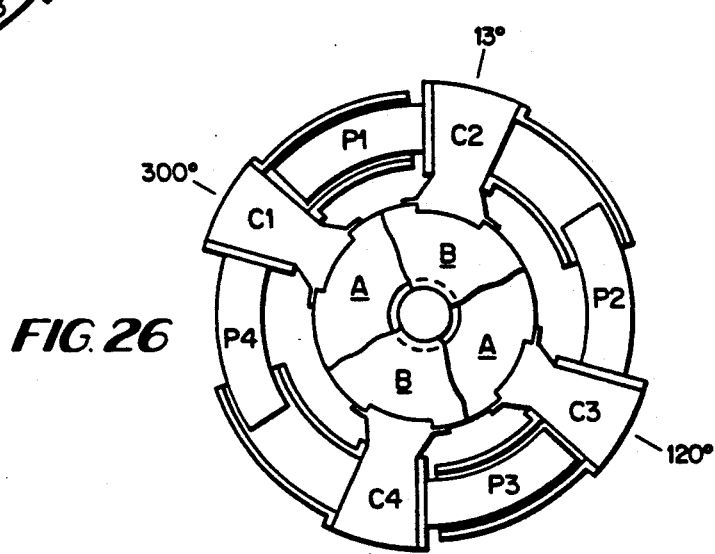
Figure 27:
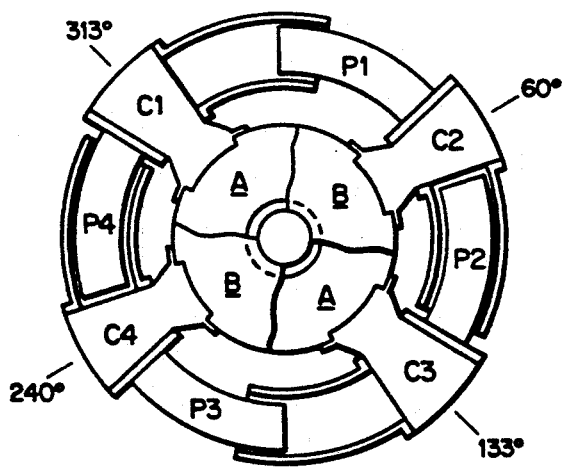

When the respective drive rotors are in the positions illustrated in FIG. 17, the next succeeding cylinder, connected with cylinder head C2, contains a compressed air-fuel charge, and upon ignition the cycle is repeated. In the meantime, the remaining cylinders are undergoing the other strokes of a standard four-stroke cycle, including compression, intake, and exhaust. Thus the cylinders undergoing ignition to provide the resulting power strokes progress circumferentially from FIGS. 16 in a sequential manner through the remaining figures to FIG. 27, whereupon after ignition in the cylinder connected with cylinder head C4 the respective structures are again in the positions shown in FIG. 16, and those same cycles are repeated to provide a rotary power to output drive shaft 14.

DRIVE CLUTCH AND PLANETARY GEAR ASSEMBLY OPERATION

As successive power strokes occur in the respective cylinders, as described generally above and as shown schematically in FIGS. 16 through 27, a series of intermittent rotary power strokes are supplied to drive output shaft 14 (see FIG. 1) through drive clutch and planetary gear assembly 12. The intermittent power strokes are alternately provided by engine drive shaft 26, which is driven by one group of pistons associated with and carried by first drive rotor 46 that is connected with engine drive shaft 26, and by engine drive sleeve 56, which is driven by a second group of pistons associated with and carried by second drive rotor 48 that is connected with engine drive sleeve 56.

Figure 28:
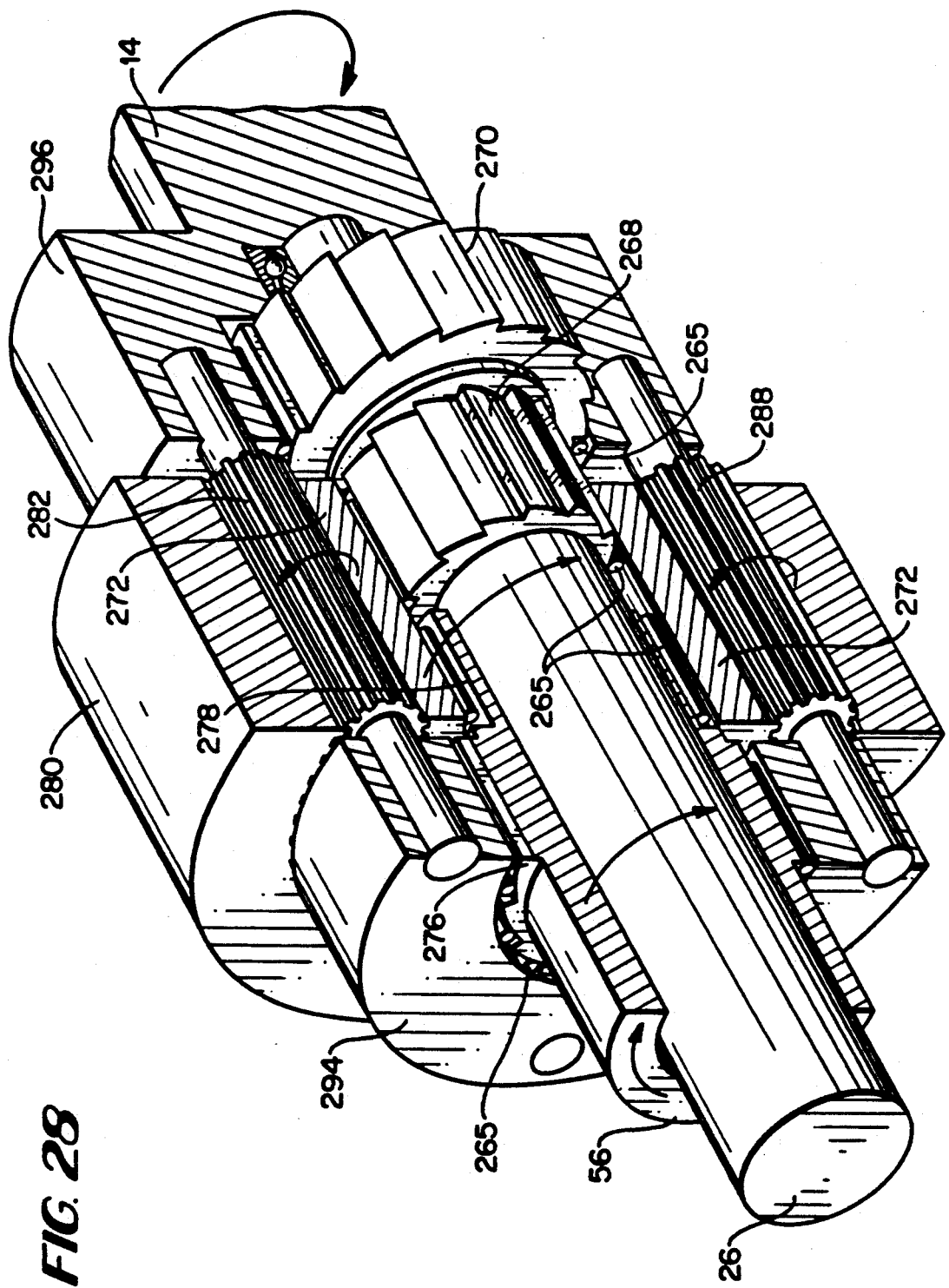
FIG. 28 is a perspective, longitudinal cross-sectional view of the drive clutch and planetary gear assembly, showing the parts that rotate when one of the two engine rotors is delivering power to the drive clutch.

Referring now to FIG. 28, drive clutch and planetary gear assembly 12 is shown with arrows indicating the operative parts when a power stroke is supplied through engine drive sleeve 56. In that case drive sleeve 56 turns in a clockwise direction, as viewed in FIG. 28, as a result of which clutch 278 is engaged to transmit torque from engine drive sleeve 56 through driven element 272 to rotate planet gears 282 and 288 (and also planet gears 284 and 286 which are not visible in FIG. 28). The planet gears travel about the inner periphery of internal ring gear 280 to carry second planet carrier 296 in the same direction of rotation as that of drive sleeve 56 to deliver torque to engine output drive shaft 14, which is connected with second planet carrier 296.

As output drive shaft 14 is being driven, engine drive shaft 26 is also being driven through the contact by rollers 265 with driving element 266 in clutch 270. However, engine drive shaft 26 is being driven by second planet carrier 296 through a smaller angle and at a slower speed than is engine drive sleeve 56 by virtue of the gear ratio of the planetary gear drive, which also provides the torque to drive second drive rotor 48. Thus, the gear ratio results in alternating different angular displacements and drive torques of the respective first and second drive rotors 46 and 48, as described above in the Engine Operation section of this description. For a four cylinder engine as illustrated and described herein in FIGS. 16 through 27, wherein the diameter at the centers of the pistons and cylinders is 12 in. and wherein the power strokes of each of the pistons encompasses 34° of arc, the overall gear ratio of the planetary gear train (the ratio of the angular speed of engine drive sleeve 56 to that of engine drive shaft 26) is 2.62 to provide proper timing of the relative movements of the respective drive rotors. If, instead, it is desired that the power strokes encompass 30° of arc, then the overall gear ratio of the planetary gear train is 2.0 to provide proper timing of the relative movements of the drive rotors. It will be appreciated that other engine diameters, other numbers of cylinders, and other arc lengths of power stroke can be employed, and that the gear ratio for the planetary gear train must be determined to provide appropriate timings for the drive rotors.

Figure 29:
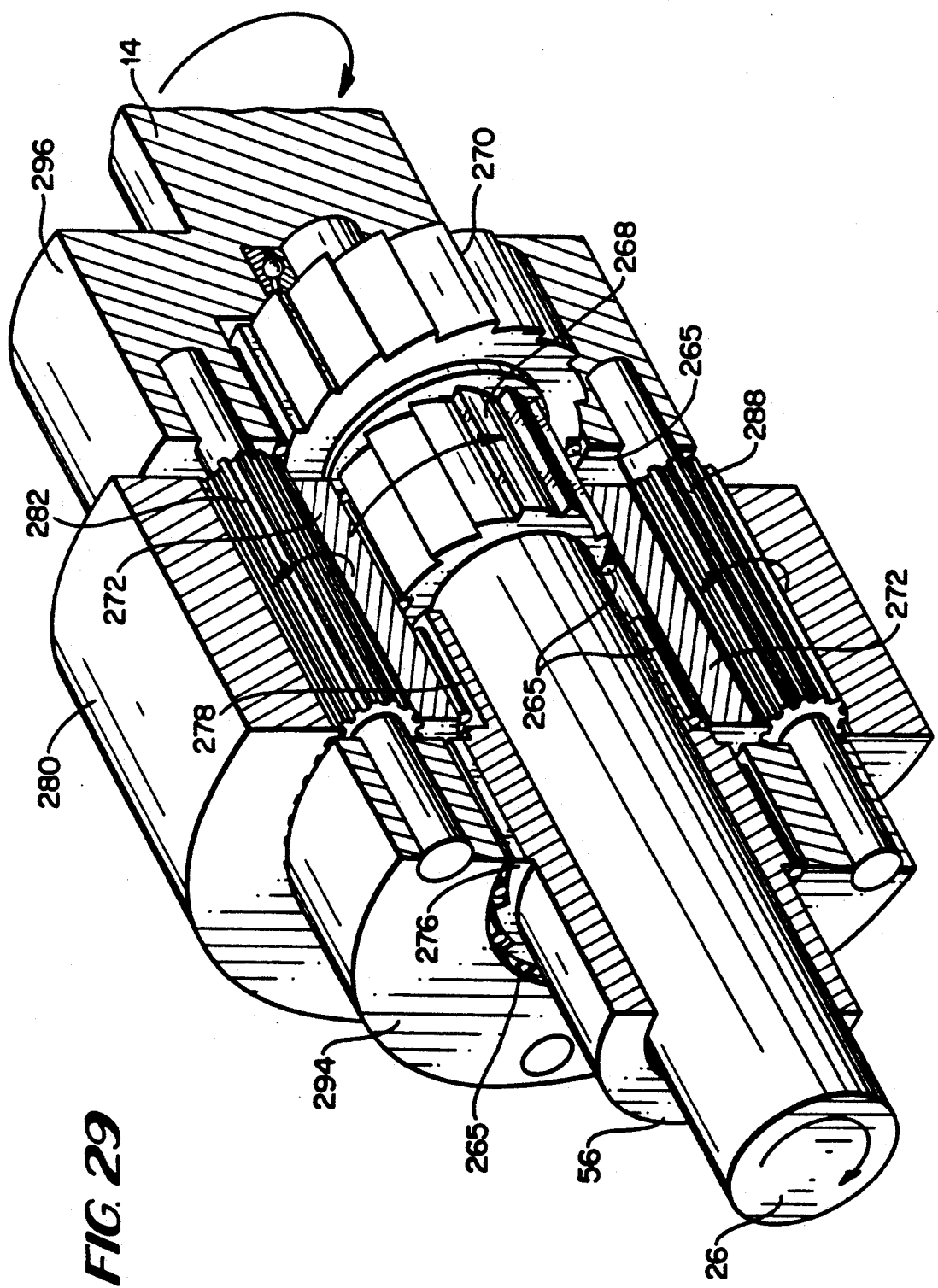
FIG. 29 is a view similar to that of FIG. 28 showing the parts of the drive clutch and planetary gear assembly that rotate when the other of the two engine rotors is delivering power.

FIG. 29 includes arrows that show the drive arrangement through drive clutch and planetary gear assembly 12 when engine drive shaft 26 is transmitting power from first drive rotor 46 to transmit torque to output drive shaft 14 through clutch 268. In that case engine drive shaft 26 turns in a clockwise direction, as viewed in FIG. 29, as a result of which clutch 268 is engaged to transmit torque from engine drive shaft 26 through driven element 272 to rotate planet gears 282 and 288 (and also planet gears 284 and 286 which are not visible in FIG. 29). The planet gears travel about the inner periphery of internal ring gear 280 to carry second planet carrier 296 in the same direction of rotation as that of engine drive shaft 26 to deliver torque to engine output drive shaft 14, which is connected with second planet carrier 296.

As output drive shaft 14 is being driven, engine drive sleeve 56 is also being driven through the contact by rollers 265 with first planet carrier 294 and with driving element 269 in clutch 276. However, engine drive sleeve 56 is being driven through a smaller angle and at a slower speed than is engine drive shaft 26 by virtue of the gear ratio of the planetary gear drive. Thus, again, the gear ratio results in alternately different angular displacements and drive torques of the respective first and second drive rotors 46 and 48, as described above in the Engine Operation section of this description.

The structure and operation of drive clutch and planetary gear assembly 12 thus integrates the cooperative operation of drive rotors 46 and 48 to sequentially transfer the successive power strokes from each of first rotor 46 and second rotor 48 provide torque to output drive shaft 14 while also shifting the rotors relative to each other in a proper timed relationship so that the succession of power strokes results in the smooth and even application of output power from the engine. In the structure as herein disclosed each piston delivers three power strokes for each complete revolution of the associated rotor, which results in 12 power strokes per revolution.

It can thus be seen that the present invention provides an improved rotary engine by providing smoother operation and by imparting greater output torque from the combustion process through the mechanical elements to the output drive shaft, and without the need for the structural complications and the additional weight imposed in conventional reciprocating engines by structural elements needed to convert linear reciprocating motion to rotary motion.

Although particular embodiments of the present invention have been illustrated and described, it will be apparent to those skilled in the art that various changes can be made without departing from the spirit of the present invention. It is therefore intended to encompass within the appended claims all such changes and modifications that fall within the scope of the present invention.

What is claimed is:

1. A toroidal internal combustion engine comprising:
   a) a pair of coaxial, independently rotatable drive rotors, each rotor carrying a plurality of circumferentially spaced cylinder heads from one side of each of which extends a toroidal cylinder sector and from another side of each of which extends a toroidal piston sector, wherein the toroidal piston sectors are longitudinally slidably received within respective ones of the toroidal cylinder sections to define a plurality of circumferentially spaced, rotary acting power cylinders for imparting substantially circumferentially directed power strokes to the drive rotors;
   b) a fuel inlet valve carried by each cylinder head for admitting at predetermined times in an operating cycle pressurized liquid fuel into each of the respective cylinders;
   c) an igniter carried by each cylinder head for igniting at predetermined times in an operating cycle an air-fuel mixture within each cylinder; and
   d) a drive clutch and gear assembly drivingly connected with each of the drive rotors and with an engine output drive shaft for transmitting successive intermittent rotary power strokes of the respective drive rotors to the engine output drive shaft to provide a substantially smooth, continuous output torque, the drive clutch and gear assembly including a plurality of overrunning clutches drivingly connected with a respective rotor and with a gear train coupled with the engine output drive shaft for imparting a unidirectional rotation to the engine output drive shaft.

2. An engine as claimed in claim 1, including intake and exhaust valves each positioned within and movable within a cylinder head for admitting an air-fuel mixture into respective ones of the cylinders at predetermined times in an operating cycle and for permitting exhaust of combustion products from the respective cylinders.

3. An engine as claimed in claim 1, wherein the respective igniters include a spark plug coupled with an intermittently operable voltage source for providing a predetermined voltage level at predetermined times in an operating cycle to ignite an air-fuel mixture within respective ones of the cylinders.

4. An engine as claimed in claim 1, wherein the fuel inlet valves are coupled with fuel flow passages within the respective rotors, the fuel flow passages communicating with fuel injectors carried in a respective rotor and operable by respective fuel flow control cams axially adjacent each rotor.

5. An engine as claimed in claim 4, wherein the fuel flow control cams are stationary and include annular undulating cam surfaces that face a respective rotor and that are engaged by the respective fuel injectors.

6. An engine as claimed in claim 1, including inlet air flow control doors carried by the respective cylinder heads, the air flow control doors permitting communication with an associated cylinder for controlling the air flow rate of ambient air into the respective cylinders through the engine inlet valves.

7. An engine as claimed in claim 6, wherein the air flow control doors include plate members slidably carried by the respective cylinder heads, the plate members including a plurality of apertures extending therethrough in a predetermined aperture pattern, and wherein the cylinder heads include a corresponding aperture pattern so that sliding movement of the air flow control doors moves the respective apertures in the plate members and in the cylinder head into and out of registry to selectively vary the flow rate of inlet air into the respective cylinders during an engine operating cycle.

8. An engine as claimed in claim 1, wherein the rotors, the drive clutch and gear assembly, and the output shaft are coaxial with each other.

9. An engine as claimed in claim 1, including an outer casing surrounding the rotors and the drive clutch assembly, air inlets positioned in the outer casing for admitting into the casing outside air for combustion and for cooling, the outer casing including exhaust gas outlets spaced from the air inlets for permitting exhaust gasses from the respective engine cylinders to escape from within the outer casing.

10. An engine as claimed in claim 9, including a baffle member extending inwardly from the outer casing and toward the engine to define within the casing an inlet air chamber and an exhaust chamber.

11. An engine as claimed in claim 10, including a flywheel positioned within the exhaust chamber of the casing, wherein the flywheel is carried by the engine output drive shaft and includes a plurality of radially outwardly extending blades that are angularly oriented relative to the output drive shaft axis for drawing air into the outer casing through th outer casing air inlets when the flywheel rotates and for exhausting exhaust gasses from the outer casing through exhaust outlets in the casing.

12. An engine as claimed in claim 1, including a plurality of valve actuation pistons radially movable within the respective rotors for pressurizing hydraulic fluid i passageways communicating with the inlet and exhaust valves, and stationary cam surfaces carried by the engine, wherein the valve actuation pistons engage the cam surfaces for radial movement of the valve actuation pistons to open the cylinder inlet and exhaust valves at predetermined times in an operating cycle.

13. An engine as claimed in claim 1, including an annular fuel flow control cam having an undulating annular face, and a plurality of fuel flow pistons corresponding in number with the number of cylinders in a rotor, the fuel flow pistons slidably carried in a rotor and extending coaxially with the rotor axis for engagement with the fuel flow control cam face.

14. An engine as claimed in claim 13, including at least one actuator movable in a direction parallel with the rotor axis and engagable with the fuel flow control cam for selectively shifting the fuel flow control cam toward and away from the rotor.

15. An engine as claimed in claim 13, including fuel flow passageways positioned within the rotor for conveying fuel from a fuel source to the respective engine cylinders.

16. An engine as claimed in claim 15, wherein the fuel flow passageways within the rotor extend between the fuel inlet valve and the fuel flow pistons.

17. An engine as claimed in claim 1, including a first contact member carried by a rotor and a second, stationary contact member coupled with an electrical energy source, wherein the first and second contact members contact each other at predetermined times in an operating cycle to transmit electrical energy from the electrical energy source to the respective igniters.

18. An engine as claimed in claim 17, wherein the first contact member is circumferentially movable to vary the timing of the transmission to an igniter of electrical energy to vary ignition timing in an operating cycle of the engine.

19. An engine as claimed in claim 18, wherein the first contact member is mounted on a carrier member that is supported by a rotor for circumferential movement relative to the rotor.

20. An engine as claimed in claim 19, including an actuator connected with the carrier member for circumferentially shifting the position of the carrier member and the first contact member.

21. An engine as claimed in claim 1, wherein the gear assembly is a planetary gear train.

22. An engine as claimed in claim 1, wherein one drive rotor includes a rotor drive shaft extending axially from the rotor to the drive clutch and gear assembly and the other drive rotor includes a rotor drive sleeve coaxial with the rotor drive shaft.

23. An engine as claimed in claim 22, wherein the rotor drive shaft and the rotor drive sleeve each carry a pair of overrunning clutch elements and the gear assembly carries cooperating overrunning clutch elements, and wherein the overrunning clutches are arranged so that when power is delivered by the rotor drive shaft a first pair of overrunning clutches is engaged and a second pair of overrunning clutches is disengaged, and so that when power is delivered by the rotor drive sleeve the first pair of overrunning clutches is disengaged and the second pair of overrunning clutches is engaged.

24. An engine as claimed in claim 23, wherein one of the first pair of overrunning clutches drives the engine output drive shaft through the gear train and the other of the first pair of overrunning clutches drives the rotor drive sleeve.

25. An engine as claimed in claim 23, wherein one of the second pair of overrunning clutches drives the engine output drive shaft through the gear train and the other of the second pair of overrunning clutches drives the rotor drive shaft.

26. An engine as claimed in claim 1, wherein the gear assembly is a planetary gear train, and wherein the planetary gear train includes a stationary ring gear, an annular sun gear that carries on its inner annular surface an overrunning clutch element associated with the rotor drive shaft and an overrunning clutch element associated with the rotor drive sleeve, and a plurality of planet gears positioned between and in engagement with each of the ring gear and the sun gear.

27. An engine as claimed in claim 26, wherein the planetary gear train includes a pair of planet carriers positioned on opposite sides of the ring gear, each planet carrier including a overrunning clutch element engagable with a corresponding overrunning clutch element carried by the rotor drive shaft and a corresponding overrunning clutch element carried by the rotor drive sleeve.

28. An engine as claimed in claim 27, wherein the engine output drive shaft is integral with one planet carrier.

* * * * *